(12) United States Patent
Garver

(10) Patent No.: US 9,644,665 B2
(45) Date of Patent: May 9, 2017

(54) METHOD FOR CORRECTING TRANSLATIONAL MISALIGNMENT BETWEEN MALE AND FEMALE FASTENER MEMBERS

(71) Applicant: MATHread Inc., Wixom, MI (US)

(72) Inventor: Michael Garver, Brighton, MI (US)

(73) Assignee: MATHREAD INC., Wixom, MI (US)

(*) Notice: Subject to any disclaimer, the term of this patent is extended or adjusted under 35 U.S.C. 154(b) by 63 days.

(21) Appl. No.: 14/671,893

(22) Filed: Mar. 27, 2015

(65) Prior Publication Data

US 2016/0281763 A1   Sep. 29, 2016

(51) Int. Cl.
*F16B 25/00* (2006.01)
*F16B 35/04* (2006.01)

(52) U.S. Cl.
CPC .................. *F16B 35/047* (2013.01)

(58) Field of Classification Search
CPC ...... F16B 25/0068; F16B 33/02; F16B 35/04; F16B 25/00
(Continued)

(56) References Cited

U.S. PATENT DOCUMENTS 3,351,115 A * 11/1967 Boehlow ............ F16B 25/0047
411/168
4,486,135 A * 12/1984 Kazino ............... F16B 25/0078
411/411

(Continued)

FOREIGN PATENT DOCUMENTS

AU    2003204363 A1   12/2004   ............. F16B 33/02

OTHER PUBLICATIONS

International Search Report and Written Opinion, Application No. PCT/US2016/020370, 13 pages, May 24, 2016.
(Continued)

*Primary Examiner* — Roberta Delisle
(74) *Attorney, Agent, or Firm* — Slayden Grubert Beard PLLC

(57) ABSTRACT

A method for correcting translational misalignment between male and female fastener members to prevent false threading, the method comprising: inserting a lead end of a male fastener member into a female fastener member, wherein the female fastener member comprises: at least one female fastening thread formed in an interior of the female fastener member, at least one female lead thread formed in the interior of the female fastener member, the at least one female lead thread having a groove in the crest, and wherein the male fastener member comprises: a shank that has a lead end for insertion into the interior of the female fastener member; at least one male fastening thread formed on the exterior of the shank as a plurality of thread windings adapted to mate with the at least one female fastening thread; at least one male lead thread formed on the exterior of the shank at the lead end that is at least a half winding around the shank and comprises a curved profile defined by an arc having a radius approximately equal to a radius of an arc that is tangent to both flanks of a thread profile of the at least one male fastening thread and below the pitch line of the at least one male fastening thread; and rotating the fastener members relative to each other while the at least one male lead thread of the male fastener member passes over and does not thread into the groove in the crest of the at least one female lead thread of the female fastener member.

36 Claims, 23 Drawing Sheets

(58) Field of Classification Search
USPC .......................................... 411/411, 412, 386
See application file for complete search history.

(56) References Cited

U.S. PATENT DOCUMENTS

| | | | |
|---|---|---|---|
| 5,730,566 A | 3/1998 | Goodwin et al. | 411/386 |
| 5,795,120 A * | 8/1998 | Hurdle | B23G 7/02 408/229 |
| 6,062,786 A | 5/2000 | Garver et al. | 411/386 |
| 7,334,975 B2 * | 2/2008 | Jungman | F16B 39/24 411/311 |
| 7,658,581 B2 * | 2/2010 | Süßenbach | F16B 25/0015 411/311 |
| 2008/0226424 A1 * | 9/2008 | Matthiesen | F16B 25/0021 411/411 |

OTHER PUBLICATIONS

International Search Report and Written Opinion, Application No. PCT/US2016/020362, 12 pages, May 30, 2016.
International Search Report and Written Opinion, Application No. PCT/US2016/020346, 12 pages, Jul. 1, 2016.
U.S. Final Office Action, U.S. Appl. No. 14/671,860, 24 pages, Nov. 21, 2016.
U.S. Final Office Action, U.S. Appl. No. 14/671,804, 20 pages, Nov. 21, 2016.

* cited by examiner

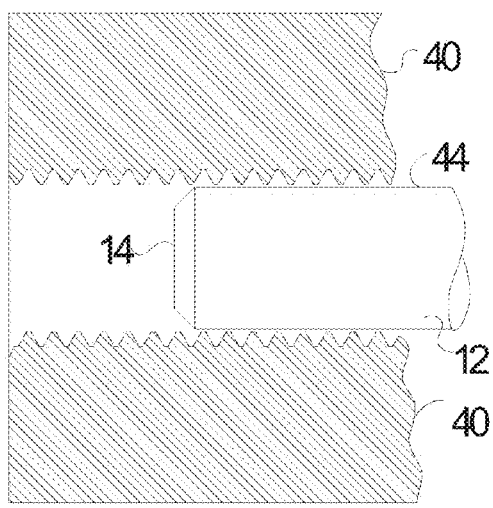
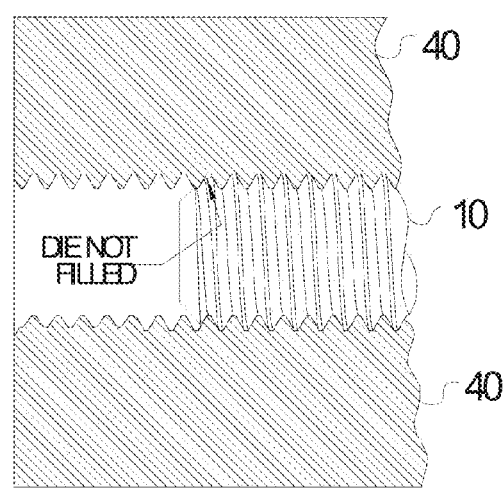
FIGURE 8A
(PRIOR ART)
FIGURE 8B
(PRIOR ART)

METHOD FOR CORRECTING TRANSLATIONAL MISALIGNMENT BETWEEN MALE AND FEMALE FASTENER MEMBERS

TECHNICAL FIELD

The present disclosure relates in general to the field of threaded fasteners such as screws and bolts and, more particularly, anti-false threading fasteners.

BACKGROUND

Threaded fastener technology is basic to the construction or fabrication of most articles of manufacture, such as machines, automobiles, trains, planes, engines, and the like. Threaded fasteners may be bolts, screws, studs, rods, or other substantially round members having uniform, non-uniform or tapered external helical threads that are screwably engaged in mating threaded fasteners, such as nuts or holes having substantially matching internal helical threads. For proper engagement of the externally and internally threaded fasteners, the longitudinal axis of the externally threaded member typically must be substantially collinear with the longitudinal axis of the internally threaded member. Further, proper engagement of externally and internally threaded fasteners typically requires that the peak of the external thread of the male helix is aligned with the root of the internal thread of the mating female helix. While this disclosure relates to any thread form, the International Organization for Standardization (ISO) metric screw thread will be illustrated as an example of a standard thread, as shown in FIG. 1. As used in this application, the designation "thread" may apply to an entire fastener thread helix, or any partial section(s) of the helix, wherein a thread may comprise a partial winding or several windings around the shank of a fastener, in the case of a male fastener member, or a partial winding or several windings around an interior hole, in the case of a female fastener member.

Failure to achieve proper thread engagement between externally and internally threaded fasteners during assembly is typically caused by one of two threading conditions that occur as the opposing helices engage and parts are rotated relative to one another. The first, typically termed "cross threading," occurs when there is both angular and linear axial misalignment between the externally thread member, typically a bolt or screw, and the internally threaded member, typically a nut or threaded hole. Specifically, cross threading is the result of the two members attempting to engage at least one-half pitch out of linear alignment while the respective helix axes are also angularly misaligned.

FIG. 2 illustrates cross threaded male and female fastener members. When fastener members are cross threaded, the male fastener member 10 member is not collinear with the female fastener member 30, and the threads wedge as the threaded helices are rotated against one another. If rotation continues when the threads are in such a wedged condition, then the threads of one or both of the members will typically be structurally damaged.

The second threading condition that causes failure to achieve proper thread engagement is normally termed "false threading," which occurs when the two helices are one-half pitch out of alignment so that the threads engage crest-to-crest rather than crest-to-root.

FIGS. 3A and 3B illustrate a false threading condition, wherein the helix axes are not misaligned, but rather they are essentially collinear. Internal threads are often manufactured with a slight depression, groove or fissure 32 at the crest of the internal threads. False threading occurs when the crest of an external lead thread 17 engages the groove 32 at the crest of the internal threads, so that the two helices are one-half pitch out of alignment. FIG. 3B is a close-up view of the false threading condition of FIG. 3A and illustrates how such grooves 32 at the crests of internal threads, while usually small in the main body of the internal thread helix, can be somewhat deeper and wider in the entry end of the helix— the lead thread section of the internal thread. In such a case, it is possible for the peak of the lead thread 17 of the external thread helix (and/or the first full thread of the helix) to attempt to enter the normal helical root in the opposing internal helix, but to instead engage the internal thread helix at the groove 32 in its crest.

Several characteristics of lead threads of internal helices currently being widely manufactured greatly increase the likelihood of false thread failures.

First, FIGS. 4A-4F illustrate how typical internal lead threads 31 of a female fastener member 30 tend to have a depression, groove or fissure 32 at their crests, which tend to cause false thread failures. These grooves 32 can be both deep and wide at the entry end of the helix. As the groove 32 progresses away from its beginning into the internal helix, it tends to narrow and become shallower, and in most fasteners, largely disappears over approximately one-half revolution of the internal helix. As such, the surface that forms the deepest point in the groove 32 tends to grow away from the axis of the internal thread helix at a rapid rate as the groove 32 in the internal lead thread 31 closes and approaches the full thread.

Second, FIGS. 5A-5B illustrate two side views of a male fastener member 10 having fastening threads 15, wherein the lead thread 17 can have a profile that usually is pointed and/or has some sort of protruding feature at its peak, which tends to cause false thread failures. FIG. 6 shows a side view of a male fastener member 10 having fastening threads 15 and an anti-cross thread 16, wherein the lead thread 17 has a typical profile with a pointed peak. FIG. 7 shows a side view of a male fastener member 10 having fastening threads 15, an anti-cross thread 16, and a dog point 22, wherein the lead thread 17 has a typical profile including a combination of curved and flat surfaces with a pointed peak. When the pointed peaks of the lead threads of male fastener members engage the grooves in the crests of the internal threads illustrated in FIGS. 4A-4F, false thread failures can occur.

Third, the relative helix angles of the peaks at the crests of the internal and external lead threads can cause false thread failures to occur. The internal and external lead threads tend to have dissimilar helix angles because of their respective methods of manufacture. If the helix angle of the external thread peak of the lead thread is greater than the helix angle of the internal peak of the lead thread, then the external peak is curved more severely. This means that during initial assembly, when the two lead threads make contact, their peaks are not essentially parallel. The more severely curved thread, i.e., the one with the larger helix angle, will tend to approach or intersect the other thread at one point on the thread. At the intersection point on the thread, the pointed peak of the external lead thread can enter into the groove in the crest of the internal thread so as to cause a false thread condition. Other orientation circumstances where the axes of the two threads are not collinear can also lead to false thread failures.

When these characteristics exist individually or in combination to allow the external lead thread pointed peak to inadvertently enter into the groove in the crest of the internal lead thread, that external peak may act as though it had threaded into a normal internal thread. Because there is no path out of the groove, the point of the external lead thread may continue to follow the groove as the fastener members are rotated relative to each other. The groove, however, very quickly becomes narrower and closes, as shown in FIGS. 4A-4F, such that there is no path for the external thread pointed peak to continue to thread. The helix angle of the line formed at the bottom of the groove in the internal lead thread is typically somewhat greater than the helix angle of the line formed at the pointed peak of the crest of the external thread. Because these lines are not parallel, i.e., the helix angles are different, the threads quickly intersect and the pointed peak of the external lead thread quickly contacts a surface in the groove in the crest of the internal thread. Thus, the pointed lead thread of the external fastener member is only able to thread freely for a few degrees of rotation until it grows too big for the shrinking groove in the crest of the internal thread, giving it no path to continue threading. Such engagement often results in the pointed peak of the external thread becoming lodged or jammed in the groove in the crest of the internal thread. Continued relative rotation of the fastener members beyond such false thread jamming point often damages or shaves off a piece of either thread, leading to structural failure of both thread helices.

Further, many external lead threads manufactured currently have a shape such that they present a bump or sudden increase in height, particularly where the lead thread is very short. If the lead thread is less than one half pitch in length (less than 180° around the shank), it may increase in height rapidly and thus be more susceptible to false threading. When an external lead thread having a bump or sudden increase in height is threaded into a groove in the crest of an internal thread, false thread failures can occur, as described above.

Various types of lead threads are in use in industry today. In all threaded fastener arts, except tapping screws, the lead thread is utilized to feed or "lead" the external thread helix into space between adjacent windings of the internal thread helix. In practice, several lead thread shapes have been utilized for this purpose. The vastly more common of these, used on most standard threaded fasteners, is a lead thread device that historically has utilized part of the first turn of the helix to grow from a zero height to the full thread height and simultaneously to grow wider in breadth. During typical manufacturing processes, this lead thread is allowed to take whatever free-form shape allows it to be easily manufactured. This shape usually includes one 60 degree flank on the side of the helix closest to the fastener head and one free-form flank on the side farthest from the fastener head. The profile of the lead thread varies significantly with manufacturing process and from fastener design to fastener design. Due to the variations inherent in manufacturing methods utilized to thread roll this lead thread section, the shape of this section is usually inconsistent in its shape and unpredictable in its growth rate. Variation is most notable in shape and linear growth in the ridge formed at the peak of the external lead thread. (See FIGS. 5A and 5B). Typical lead threads typically have a relatively sharp point at the crest of the lead thread because only one flank has a flat surface at the standard 60° angle, while the opposite flank surface is free-form at an angle much greater than 60°, and the two flanks connect directly with each other, rather than through a flat surface parallel to the longitudinal axis of the fastener shank like the remaining standard threads.

One "non-standard" fastener includes an anti-cross thread more fully described in U.S. Pat. No. 5,730,566, incorporated in its entirety herein by reference. These non-standard fasteners include three threads: the lead thread 17, the anti-cross thread 16, and the fastening threads 15. (See FIG. 6). Typical lead threads on fasteners having anti-cross threads are somewhat different than lead threads on standard fasteners, but they are just as susceptible to variation in profile and length. The profile of a typical lead thread of a fastener having an anti-cross thread has three common characteristics in every section of the lead thread helix.

First, as shown in FIG. 7, the lead thread flank 17b closest to the anti-cross thread 16 tends to maintain a curve not unlike one half (or less) of that seen in the anti-cross thread 16, in essence, mirroring one-half of the anti-cross thread 16. The base of this curved lead thread flank 17b shares its root with the anti-cross thread 16. As such, its root appears to be a continuation of the anti-cross thread's root, and half of the lead thread profile appears to be an anti-cross thread profile. As this flank approaches the end of the helix, the curved surface becomes increasingly narrower, finally disappearing at the end of the helix as the lead thread reaches zero height. The other lead thread flank 17a tends to be essentially flat and angled to the axis of the fastener, at an angle and flatness as well as convexity and concavity that typically vary significantly and freely in every section, depending on the location on the helix as well as manufacturing technique. Typically, the angle, convexity or concavity of this flank is not controlled during manufacturing and varies significantly in angle, growth rate, and contour throughout the lead thread's length. As the lead thread traverses around the body, this "flat" flank 17a tends to narrow and shrink in height. This "narrowing" is the result of the root of the flat-angled flank moving closer and closer to the root between the lead thread 17 and the anti-cross thread 16, as the lead thread 17 traverses around the shank. Ultimately, this flat-angled flank 17a narrows to zero as the height and breadth of the lead thread 17 decreases toward the end of the helix. Therefore, as this pointed peak of the lead thread is typically formed by unrestricted free-flowing metal, it tends to vary significantly in shape throughout the length of the lead thread, as well as from fastener to fastener.

Third, the flanks of the lead thread 17 tend to form a point rather than a flat or curved crest at the intersection of the two flanks.

FIGS. 8A-8C illustrate cross-sectional side views of a typical process for manufacturing a fastener from an unthreaded fastener blank by rolling it between opposite thread rolling dies. In FIG. 8A, thread rolling dies 40 are separated to demonstrate placement of the fastener blank 41 prior to rolling. The shank 12 of the fastener blank 41 usually has a constant diameter to allow formation of standard threads, and the lead end 14 of the unthreaded fastener blank usually has a chamfer 9 to allow formation of a lead thread. FIG. 8B shows the thread rolling dies 40 in a rolling position so that the threads are being formed on the fastener blank to form male fastener member 10. In typical manufacturing practices, used for both standard and anti-cross thread fasteners, the threads may be formed by rolling an essentially cylindrical, unthreaded fastener blank 41 through thread rolling dies 40. The dies 40 impart the thread profiles onto the unthreaded blank 41 by displacing metal into grooves formed in the thread rolling dies. As shown in FIG. 8C, a fastening thread 15 may be formed on the constant diameter shank portion of the unthreaded fastener blank by allowing the metal to flow into grooves of the dies until the grooves are completely filled with metal from the blank. The fastening threads 15 formed on the shank of the fastener tend to have completely uniform profiles because the metal completely fills the grooves in the dies. The lead thread 17, however, may be formed by incompletely filling grooves of the rolling dies 40 with metal from the chamfered end of the fastener blank. In the lead thread section of the fastener, the thread helix is formed by only partially filling the grooves in the rolling dies. Partial filling occurs because the fastener blank has a chamfer at its end, as shown in FIG. 8A.

FIG. 8C illustrates a close-up view of the lead thread section shown in FIG. 8B. Because the unthreaded fastener blank has a chamfer at its end, there is not enough metal present in the lead thread area to completely fill the grooves in the thread rolling dies 40. The lead thread 17 for both standard fasteners and anti-cross thread fasteners is formed by partially filling the die grooves in the lead threaded section. Partial filling allows the metal to freely flow into a variety of lead thread profiles as described above. Thus, lead thread profiles are inherently inconsistent due to blank, die, and process variation. In most known lead threads, variation is inherent because of the thread rolling dies allow unrestricted free-flowing metal to take a variety of lead thread profiles.

Some lead thread profiles are particularly susceptible to false threading. In some cases, the lead thread profile varies too much over the length of the lead thread, so as to cause false threading. For example, the lead thread may increase in height too quickly, i.e., it grows from the shank to the full height of a standard thread in less than 180° around the shank. For another example, the angle of the front flat-angled flank of the lead thread may be too steep to allow proper mating with female threads. As a further example, the lead thread profile may be severely pointed, which can lead to possible false threading and/or unintended and undesirable contact with internal female threads during initial threading. For anti-cross thread fasteners, some lead thread profiles may cause the anti-cross thread fastener to false thread in internal female threads before the anti-cross thread has an opportunity to align the fastener members for proper threading. Some lead thread profiles cause the internal and external threads to contact each other in an undesirable location on the respective helices, before the anti-cross thread acts upon the internal thread to align the fastener members, thus hindering and/or preventing the anti-cross thread from camming over the internal lead thread of the female fastener member. This may be especially true when initial angular misalignment of the two fastener members is high. Additionally, many lead thread profiles on an external male fastener member may engage a groove in the internal female lead so as to cause a false threading condition, as described above.

Some lead threads used on anti-cross thread fasteners have a steep helix angle, such that the lead thread grows from zero height to the height of the anti-cross thread in just 270° around the shank. The peaks of short lead threads such as these may engage the groove in the lead threads of internal female fasteners and/or the smaller grooves in the internal full threads, which leads to false threading.

In still other lead threads used on anti-cross thread fasteners, the width of the lead thread profile is maintained constantly to be similar to the width of the standard thread, as the height of the lead thread increases over the length of the lead thread. These lead threads tend to form a profile, which is different in every section of the lead thread. They tend to have a very flat curve near the beginning of the lead thread, and a progressively smaller, more pointed profile as the lead thread helix progressively blends into the profile of the anti-cross thread. These lead threads tend to lodge in the groove at the tip of the internal female lead thread as the lead thread grows in height, which leads to false threading.

What is needed, therefore, is an external lead thread of a male fastener member that tends to prevent false threading of the lead thread into a groove in the peak of the internal thread of a female fastener member. The lead thread should not be subject to manufacturing variations causing undesirable localized lead thread heights and profiles, and large helix angles. For anti-cross thread fasteners, a lead thread is needed that facilitates, rather than hinders, the performance of the anti-cross thread.

SUMMARY

Fasteners, fastener systems, and methods for preventing or resisting false threading are disclosed.

One embodiment of the invention provides a method for correcting translational misalignment between male and female fastener members to prevent false threading, the method comprising: inserting a lead end of a male fastener member into a female fastener member, wherein the female fastener member comprises: at least one female fastening thread formed in an interior of the female fastener member, at least one female lead thread formed in the interior of the female fastener member, the at least one female lead thread having a groove in the crest, and wherein the male fastener member comprises: a shank that has a lead end for insertion into the interior of the female fastener member; at least one male fastening thread formed on the exterior of the shank as a plurality of thread windings adapted to mate with the at least one female fastening thread; at least one male lead thread formed on the exterior of the shank at the lead end that is at least a half winding around the shank and comprises a curved profile defined by an arc having a radius approximately equal to a radius of an arc that is tangent to both flanks of a thread profile of the at least one male fastening thread and below the pitch line of the at least one male fastening thread; and rotating the fastener members relative to each other while the at least one male lead thread of the male fastener member passes over and does not thread into the groove in the crest of the at least one female lead thread of the female fastener member.

Another embodiment provides a method for correcting translational misalignment between male and female fastener members to prevent false threading, the method comprising: inserting a lead end of a male fastener member into a female fastener member, wherein the female fastener member comprises: at least one female fastening thread formed in an interior of the female fastener member, at least one female lead thread formed in the interior of the female fastener member, the at least one female lead thread having a groove in the crest, and wherein the male fastener member comprises: a shank that has a lead end for insertion into the interior of the female fastener member; at least one male fastening thread formed on the exterior of the shank as a plurality of thread windings adapted to mate with the at least one female fastening thread; at least one male lead thread formed on the exterior of the shank at the lead end that is at least a half winding around the shank and is shortest at a beginning end of the male lead thread winding and tallest at the other end of the male lead thread winding, wherein the at least one male lead thread comprises a crest that has a height that changes at a substantially constant rate between the ends of the male lead thread winding, and wherein the male lead thread comprises a male lead thread flank that is anchored to the root of an adjacent thread winding along the entire length of the male lead thread; and rotating the fastener members relative to each other while the at least one male lead thread of the male fastener member passes over and does not thread into the groove in the crest of the at least one female lead thread of the female fastener member.

Still another embodiment provides a method for correcting translational misalignment between male and female fastener members to prevent false threading, the method comprising: inserting a lead end of a male fastener member into a female fastener member, wherein the female fastener member comprises: at least one female fastening thread formed in an interior of the female fastener member, at least one female lead thread formed in the interior of the female fastener member, the at least one female lead thread having a groove in the crest, and wherein the male fastener member comprises: a shank that has a lead end for insertion into the interior of the female fastener member; at least one male fastening thread formed on the exterior of the shank as a plurality of thread windings adapted to mate with the at least one female fastening thread; at least one male lead thread formed on the exterior of the shank at the lead end that is at least a half winding around the shank, wherein the at least one male lead thread is shortest at a beginning end of the male lead thread winding and tallest at the other end of the male lead thread winding, wherein the male lead thread comprises a profile that has a height and shape adapted to resist false threading into a groove at the crest of a female lead thread in the interior of a female fastener member; and rotating the fastener members relative to each other while the at least one male lead thread of the male fastener member passes over and does not thread into the groove in the crest of the at least one female lead thread of the female fastener member.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying figures, which are included as part of the present specification, illustrate the various embodiments of the presently disclosed system and method and together with the general description given above and the detailed description of the embodiments given below serve to explain and teach the principles of the present fasteners, fastener systems, and fastener methods.

FIGS. 3A and 3B show side views of prior art male and female fastener members, which are translationally misaligned relative to each other so to be out of pitch for potential false threading of the fasteners, wherein FIG. 3B is a close-up view relative to FIG. 3A.

FIGS. 8A-8C show side views of a prior art fastener blank being rolled between dies and illustrate how a lead thread is typically formed on a fastener by allowing the metal of a fastener blank to only partially fill a groove in the die so that the lead thread is a free form.

FIGS. 9A and 9B, wherein FIG. 9B is a close-up view, illustrate side views of a male fastener member of the present invention having: a head and a shank wherein the shank has a fastening thread, an anti-cross thread, and a lead thread in the same helix.

Figure 1:
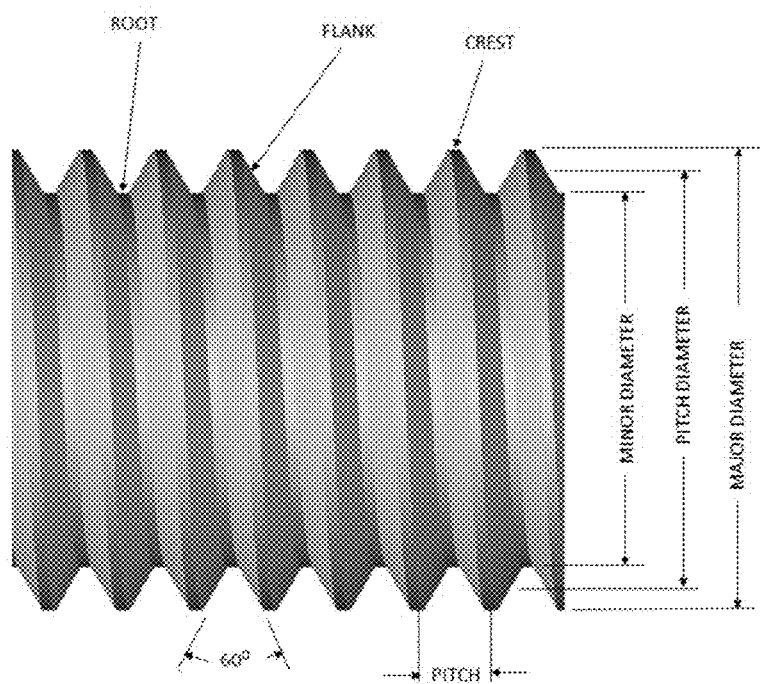
FIG. 1 illustrates a side view of a prior art male fastener member with a standard thread, wherein several parts of the standard thread are identified, including" crest, flank, root, pitch, thread angle, minor diameter and major diameter.
Figure 2:
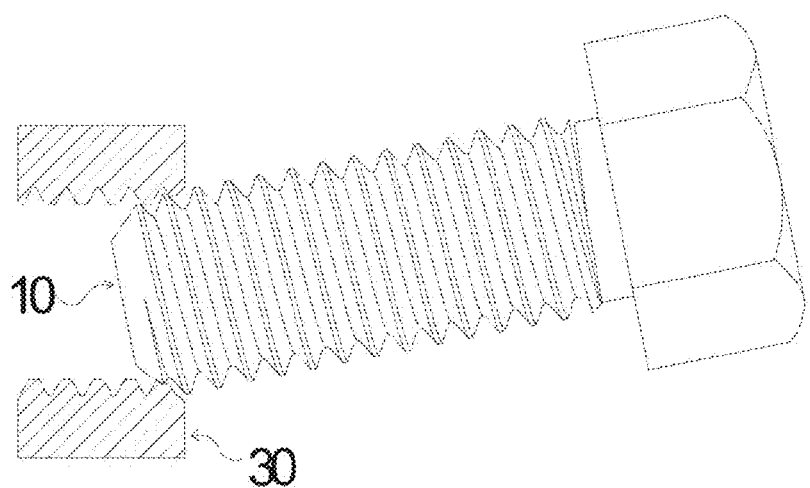
FIG. 2 illustrates a side view of prior art male and female fastener members with misaligned longitudinal axes, which is a condition for potential cross threading with prior art fasteners.
Figure 3A:
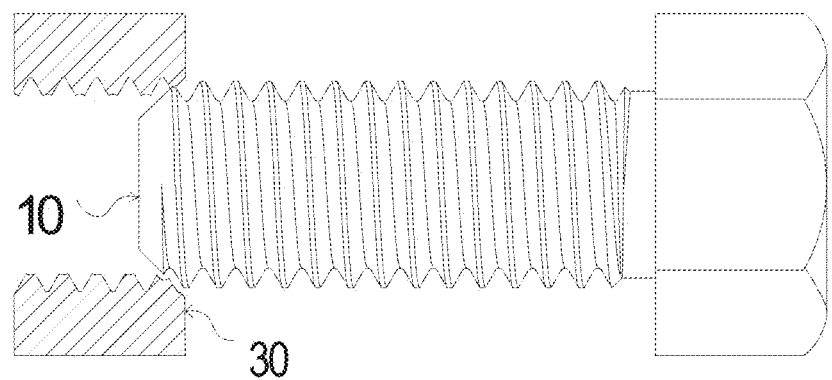
Figure 3B:
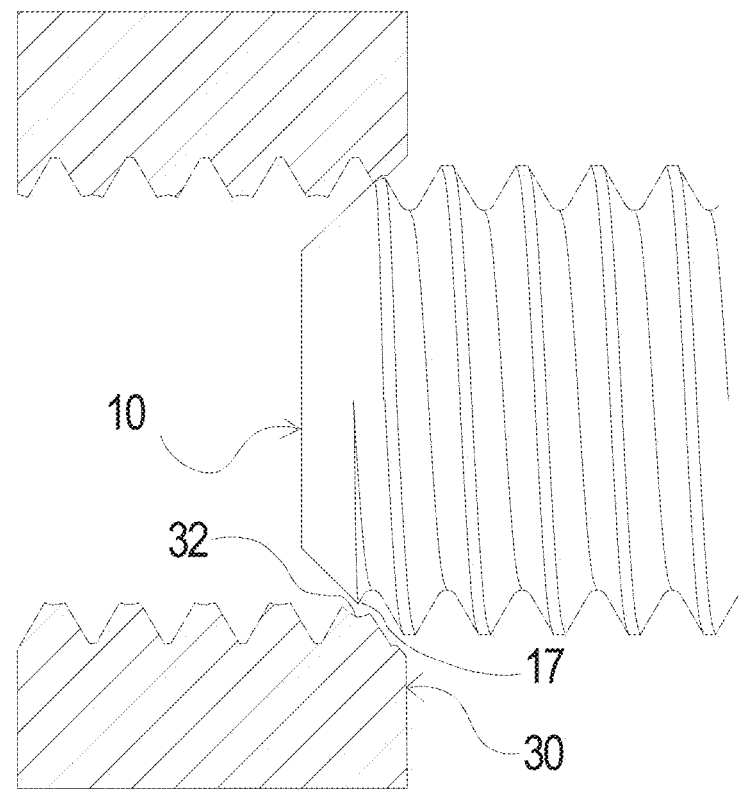
Figure 4A:
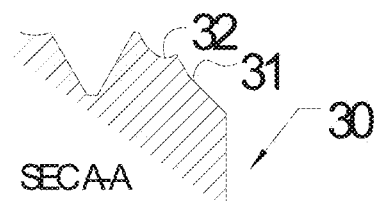
FIGS. 4A-4F illustrate cross-sectional side views and an end view of a prior art female fastener member having an female lead thread in an interior of the female fastener member, wherein the female lead thread has a groove in its crest.
Figure 4B:
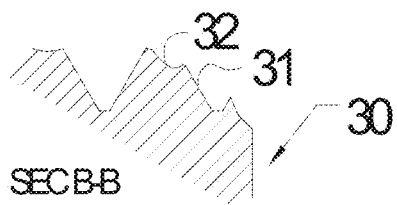
Figure 4C:
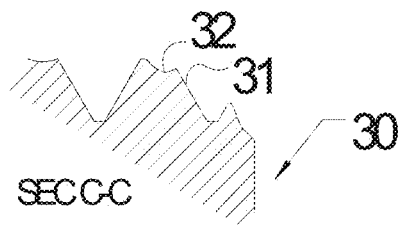
Figure 4D:
Figure 4E:
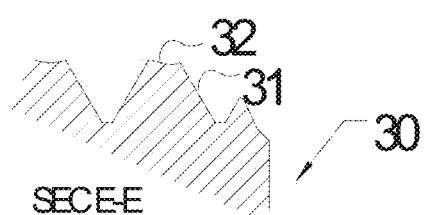
Figure 4F:
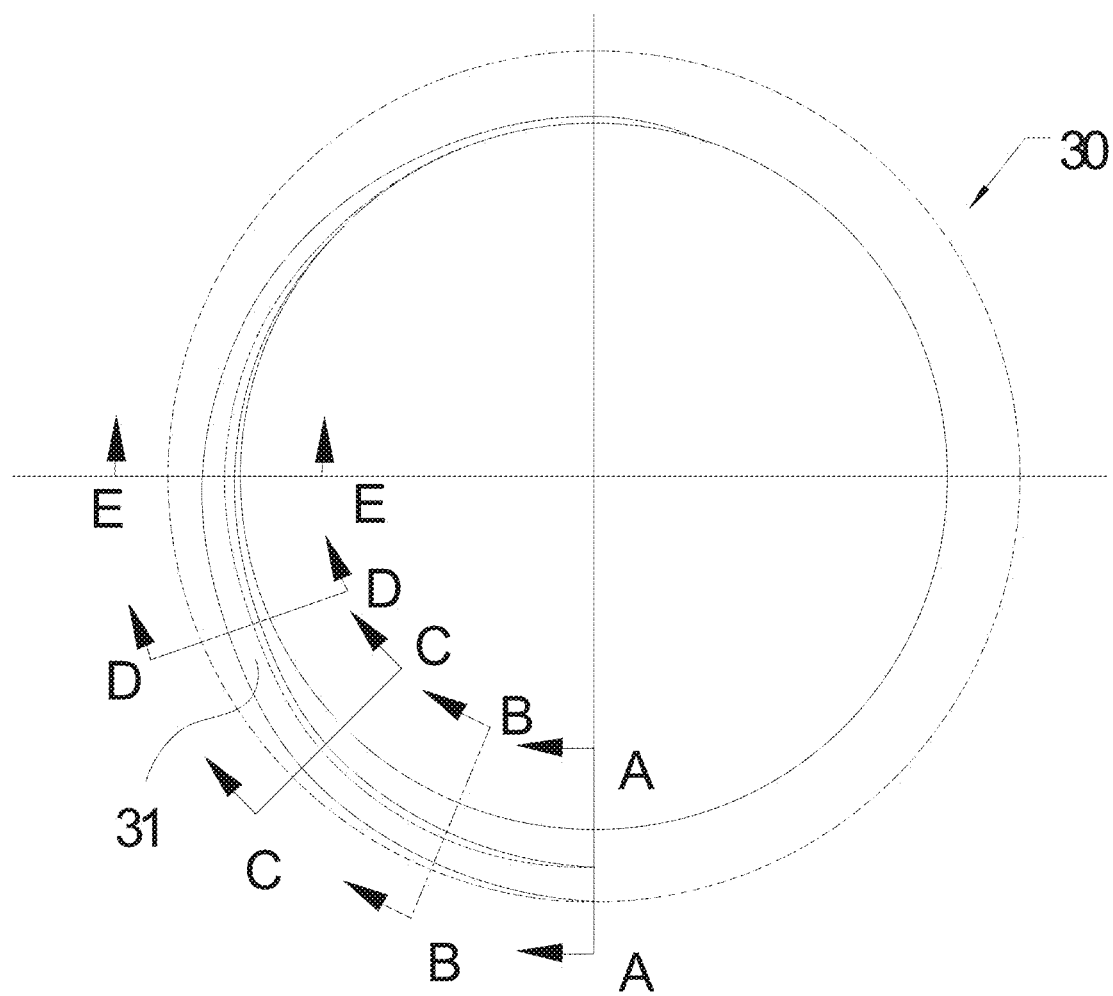
Figure 5A:
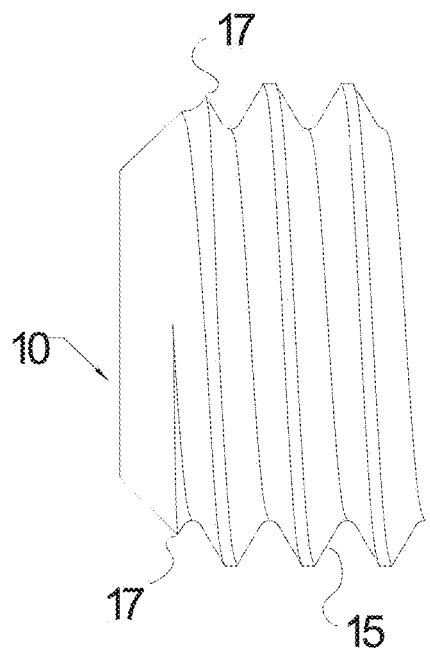
FIGS. 5A and 5B shows side views of a prior art male fastener member having a pointed lead thread.
Figure 5B:
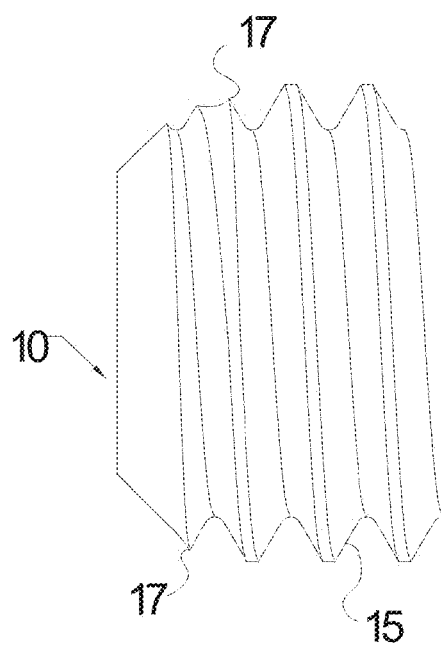
Figure 6:
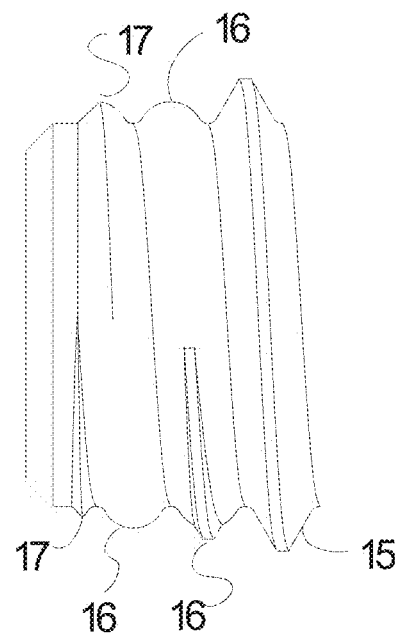
FIG. 6 illustrates a side view of a prior art male fastener member having a pointed lead thread that blends into an anti-cross thread.
Figure 7:
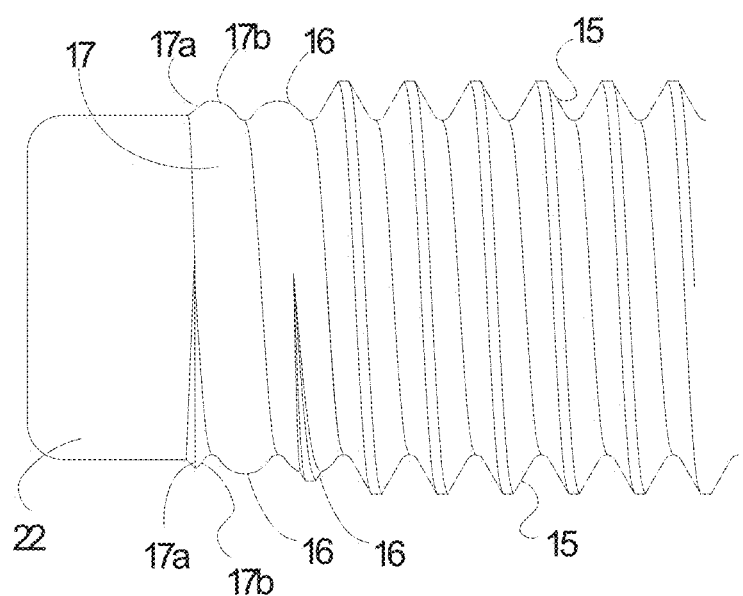
FIG. 7 shows a side view of a prior art male fastener member with a lead-in point and a pointed lead thread that blends into an anti-cross thread.
Figure 8C:
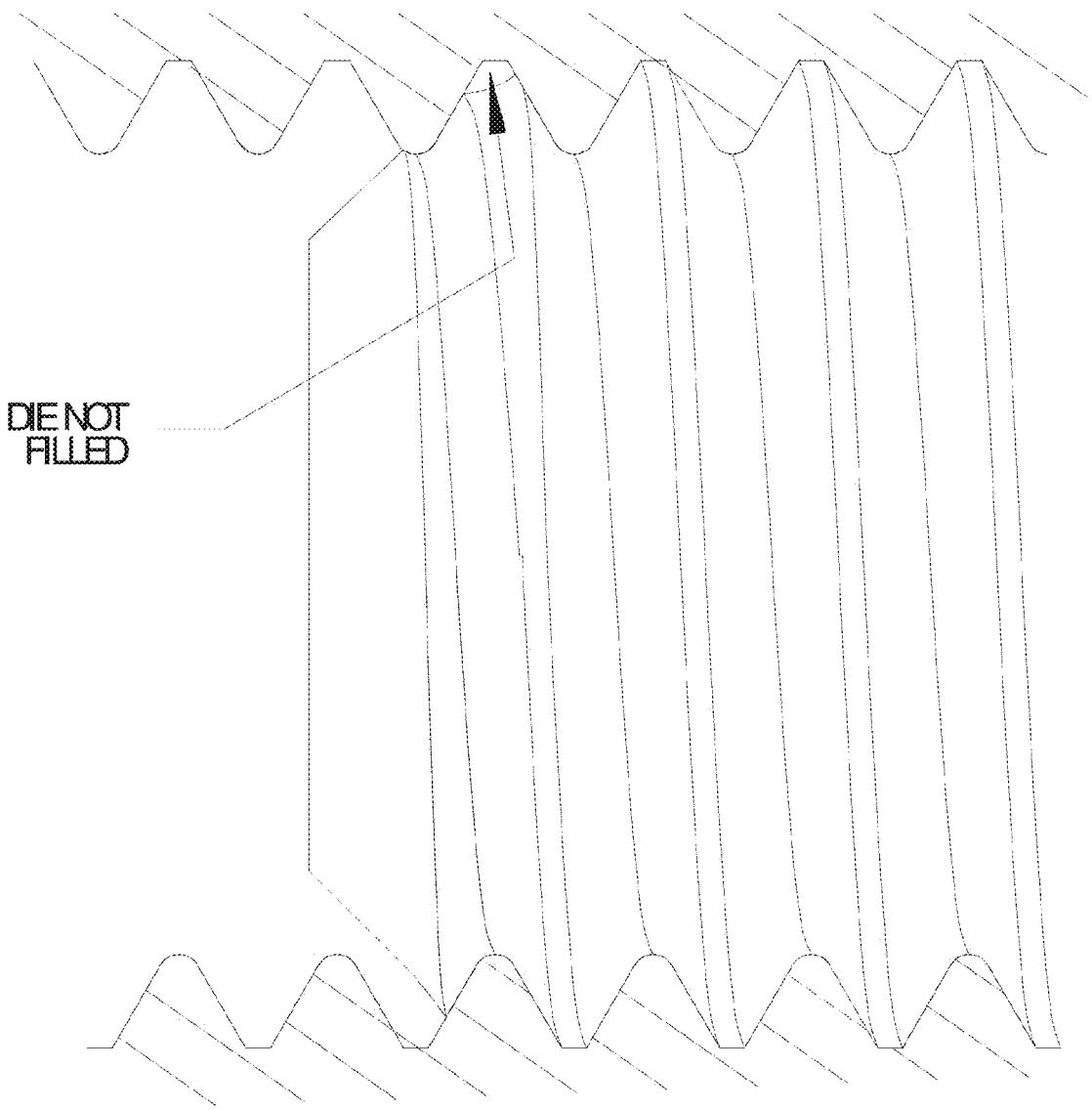

The figures are not necessarily drawn to scale, and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

According to the teachings of this disclosure, this invention meets the aforementioned need and also overcomes other shortcomings and deficiencies of existing fastener technologies by providing a novel beginning to the thread helix (otherwise termed the 'lead thread' of a threaded fastener), an anti-false thread aligning lead thread, whose unique contour is such that it does not deeply enter into and/or remain in any grooves present in the peak of the lead thread, and/or full thread, of the internal thread helix of a female fastener member. The lead thread with an anti-false threading contour may be present on the fastener for approximately one and one fifth turns of the helix, wherein it maintains essentially the same broadly curved peak profile in every axial section of the lead thread.

Figure 9A:
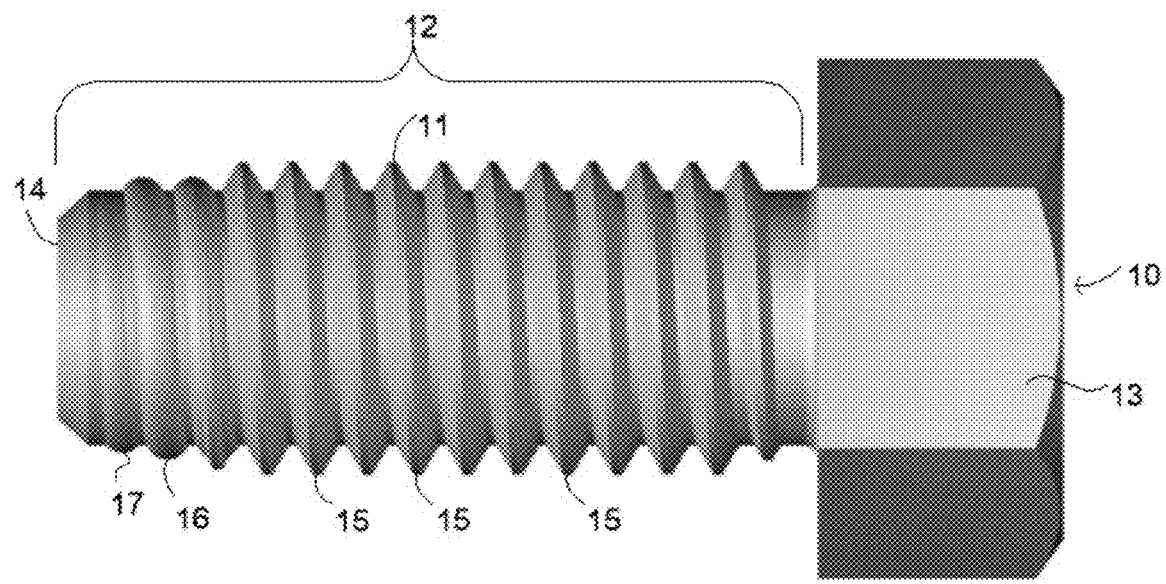
Figure 9B:
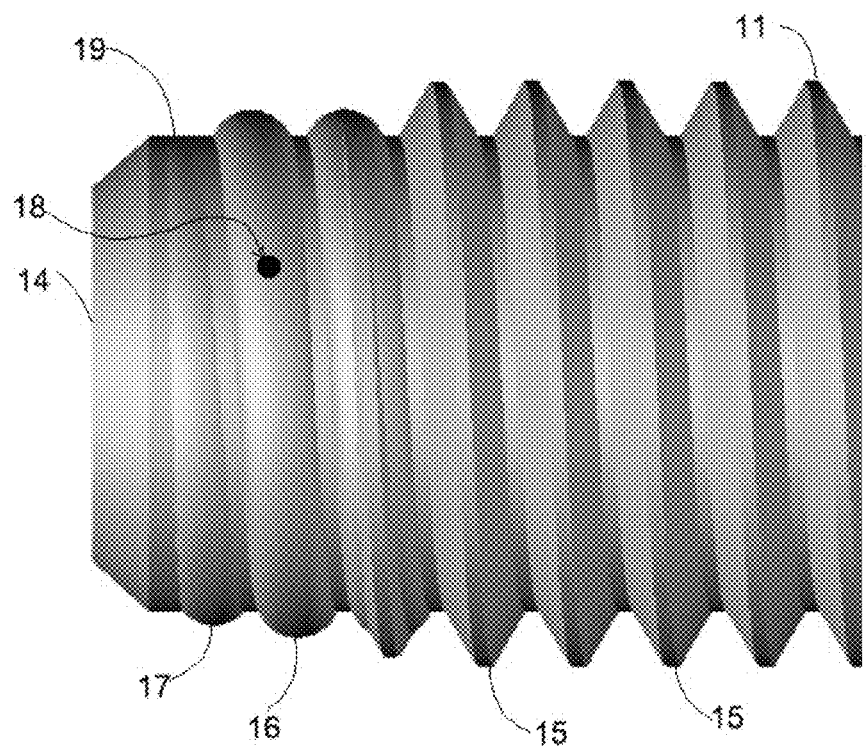

FIGS. 9A and 9B illustrate one embodiment of the present invention, wherein FIG. 9B is a close-up view of the lead end portion of the fastener shown in FIG. 9A. As shown in FIGS. 9A and 9B, the fastener comprises both an anti-cross thread and a lead thread that prevent false threading. The male fastener member 10 of this embodiment is a bolt or screw having a helix of threads 11 externally wound on the shank 12 of the male fastener member 10. A head 13 is formed at one end of the shank 12 of the male fastener member 10 and is adapted to be engaged by a means for applying rotational torque. The head 13 may be slotted to receive a flat, Phillips, Torx, or the like screwdriver blade, or may have a plurality of surfaces for engagement by a wrench, socket, Allen or other means for rotationally engaging the head. The head 13 may take any form known in the art for imparting rotational engagement to the fastener. The male fastener shank may also be connected to a portion of the device to be fastened, such as by welding or other means, so that a female fastener member may be rotationally threaded thereon for fastening. In this case, the feature connected to a portion of the device to be fastened is the head of the male fastener member.

The helix of threads 11 wound around the shank 12 of the male fastener member 10 may take several distinctly different profiles over its length, as it progresses about the shank 12 from the head 13 to the lead end 14 of the fastener. These diverse thread profiles are discussed with reference to FIGS. 9A and 9B. Adjacent to the head 13 may be several windings of fastening thread 15, such as are found on a standard fastener (see FIG. 1). These threads may be followed, as the helix 11 winds away from the head 13, by a short section of anti-cross threads 16, wherein the fastening thread 15 blends into the anti-cross thread 16 on the same helix 11. The anti-cross thread 16 has a profile that imparts anti-cross thread function to that section of the helix, as at least a portion of one turn of the thread helix has a transitionally curved surface from the minor diameter to the major diameter. A detailed description of an anti-cross thread 16 is provided in U.S. Pat. No. 5,730,566, incorporated herein in its entirety by reference. The anti-cross thread 16 may be followed on the helix 11 by the lead thread 17. All of these thread profiles, no matter their specific localized shape and contour, are contained within the envelope defined by the profile of a fastening thread 15.

In an alternative embodiment of a male fastener member, the helix of threads 11 comprises a fastening thread 15 and a lead thread 17, without an anti-cross thread, such that the fastening thread 15 blend directly into the lead thread 17.

As shown in FIG. 9B, the lead thread 17 begins at the location on the helix 11 where the lead thread 17 joins with the anti-cross thread 16 at blend point 18 and extends one-and-one-fifth rotations around the helix 11 to the helix termination point 19. At blend point 18, the lead thread 17 reaches its highest or tallest point, as measured from the thread axis, and has a height and profile that matches that of the anti-cross thread 16. From the blend point 18, the lead thread 17 follows the helix 11 for one-and-one-fifth turns around the male fastener member 10 and away from the head 10, until the lead thread 17 ends at the helix termination point 19. The height of the lead thread, as measured from the roots of the fastening thread 15, decreases at an essentially constant rate over its entire length as it winds about the fastener body toward the lead end 14 of the male fastener member 10. In one embodiment, the rate of decrease of the height of the lead thread 17 is not significantly more and not significantly less than a rate of decrease calculated by utilizing a length of approximately one-and-one-fifth turns of the helix, until its height and breadth reach essentially zero at the helix termination point 19 at the root height of the fastening thread 15 (minimum diameter).

From the lead end 14 of the male fastener member 10, the lead thread 17 may begin at zero height on a cylinder of a diameter defined by the root of the fastening thread 15. The apex of the lead thread peak may begin at the standard thread root height, then as the lead thread winds about the body of the fastener toward the head 13, its peak may diverge from the root height and the axis of the fastener's helix, at a constant rate, such that the peak grows in height from essentially zero at its beginning to a height just less than the pitch line of the standard thread, which is about the height of the anti-cross thread 16, at the blend point 18. During this increase in height, the width of the lead thread profile increases gradually as the lead thread progresses about the body of the fastener.

In one aspect of the current invention, the anti-false thread lead thread may be so shaped that the height of the thread increases at a designated maximum constant rate as it progresses about the fastener body from the helix beginning to its blend with the next section of the helix. In alternative embodiments, the lead thread may extend around the shank for any number of turns of the helix so long as rate of increase does not present a steep point at the crest of the lead thread that could become false threaded in a female fastener member. The rate of increase may be such that the included helix taper angle of the peak of the external lead thread profile is consistent and does not present a severely angled surface, bumps, sharpness or other inconsistent features that might readily enter any groove in the peak of the lead thread of the normal internal thread helix when the external lead thread is presented to the receiving internally threaded member at any normal angle of assembly. As such, when the peaks forming the respective ridges of the mating lead threads of the two members contact at any point during assembly, the peak of the external fastener does not increase in height at such a rapid rate that it grows into any groove in the internal peak (and prevent further progression of the two thread helices into one another) before the two peaks slide over one another due to axial load being applied by the installer. The exterior lead thread profile allows the two lead threads to contact one another and then slide past one another without wedging and/or jamming of the two threads as the fasteners are rotated in assembly.

In another aspect of the current invention, the lead thread may have a constant profile in every axial section of the helix and the profile may be an essentially non-pointed, broad curve, or series of flats and/or curves approximating a smooth curve of the designated radius, essentially unchanging in peak profile throughout the length of lead thread, such that in the event of undesirable contact with the groove present in the peak of the internal thread of a female fastener member, the external thread peak of a male fastener member may not readily enter any such groove, nor may it present an increasingly more pointed or inconsistent peak to the internal thread groove as it rotates when in contact with the groove of the internal thread. Being so configured, the lead thread of the male fastener member may not thread into and become lodged in any groove present in the peak of the receiving helix's lead thread, thereby avoiding false threading or otherwise interfering with the necessary axial realignment taking place due to the anti-cross thread motion of the adjacent anti-cross thread section of the helix.

In another aspect of an embodiment of the invention, the peak of the external lead thread of a male fastener member forms an essentially non-helical annular ring, within an envelope of a standard thread profile helix path about the fastener body. Thus, when presented to the helically shaped peak of an internal lead thread of a female fastener member, the peak of the external lead thread of a male fastener member extends across the groove in a peak of the internal lead thread. When the fastener members are rotated relative to each other, the peak of the external lead thread of a male fastener member passes over and does not thread into the groove in the peak of the internal lead thread of the female fastener member.

Embodiments of the present invention may prevent false threading when an externally threaded member engages an internally threaded member. Embodiments of the invention may prevent cross threading when an externally threaded member engages an internally threaded member. Embodiments of the invention may correct linear misalignment (non-collinearity) between two screwably attachable members have mating helical threads. Embodiments of the invention may correct angular misalignment (angular non-collinearity) between two screwably attachable members have mating helical threads. Embodiments of the invention correct angular misalignment between a first fastening member and a second fastening member by having one or more threads of the first member cam over the threads of the second member, thereby bringing the first and second member into angularly collinear alignment.

Embodiments of the invention correct linear misalignment between a male fastening member and a female fastening member by providing an external lead thread of the male fastening member that bridges any groove present in the peak of an internal thread of the female fastening member while sliding along the peak and traversing over the edges of the groove of the female fastening member, in the process of bringing the male and female members into collinear alignment and/or collinear alignment.

Some embodiments of the invention minimize inadvertent contact of the lead thread sections of the external thread helix with the peak of the internal thread helix, during a camming action of an anti-cross thread within the fasteners. The lead thread may have a consistent lead thread profile at various cross-sections of the lead thread. The lead thread may have a constant maximum growth rate from its termination point at the fastener shank to the point at which it blends into the next thread form, whether the next thread form is an anti-cross thread, a standard thread, or any other known thread form.

Some embodiments of the invention have a protruding diameter feature at the leading end of the male fastener member, such as a lead point or dog point, which restricts the misalignment angle between male and female members.

A consideration of fastener design is to maintain the length of the design envelope for the fastener while adding anti-cross thread and anti-false thread features to the fastener. Embodiments of the invention include lead threads that reduce false threading, anti-cross threads, and dog points, without exceeding the design envelope for the overall length of the fastener.

In one aspect of the present invention, the lead thread of a male fastener member may not false thread in the internal thread helix of a female fastener member by maintaining its external lead thread peak (center) as close as possible to the root of the thread adjacent to the lead thread. Thereby, the lead thread forms an essentially non-helical thread within the envelope of the normal external thread helix, thus allowing the lead thread to deliberately cross over any helical groove the internal thread's peak without engaging or false threading into the groove.

Aspects of the present invention may prevent the lead thread section of a helix from interfering during thread camming of an adjacent anti-cross thread section of the helix. Interference may be avoided where the lead thread has an essentially constant the growth rate and the lead thread has a thread profile that blends smoothly into the profile of the adjacent anti-cross thread, so that the lead thread supports any further camming that may need to take place to aid the anti-cross thread in accomplishing its normal function of aligning the fastener members.

Certain embodiments of the invention may eliminate interference of the lead thread of a male fastener member with the peak of the internal thread of a female fastener member during a camming action of an anti-cross thread. Interference may be eliminated by a consistent, fully-formed, broad curved lead thread profile that consistently changes in height, width, and profile over the length of the lead thread.

Depending on the length of the lead thread on a male fastener member, it may deliberately presents a consistent maximum thread height at its potential contact point with the peak of the internal thread to prevent undesirable contact of the lead thread with the peak of the internal thread helix when the male fastener member is inserted into the female fastener member.

Figure 10A:
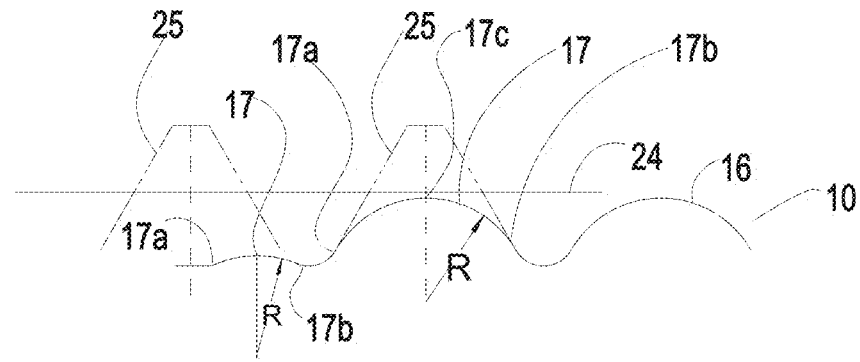
FIGS. 10A-10E illustrate cross-sectional side views and an end view of a male fastener member of the present invention having an anti-cross thread and a lead thread in the same helix, wherein the lead thread is anchored to the anti-cross thread.
Figure 10B:
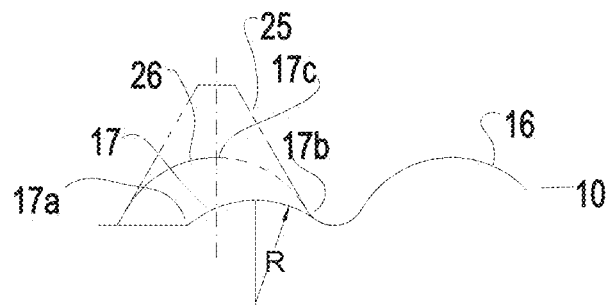
Figure 10C:
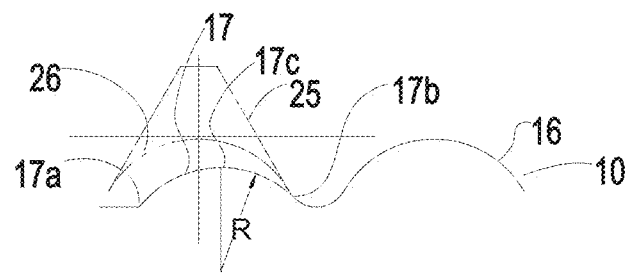
Figure 10D:
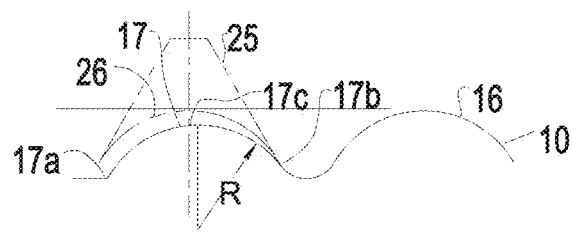
Figure 10E:
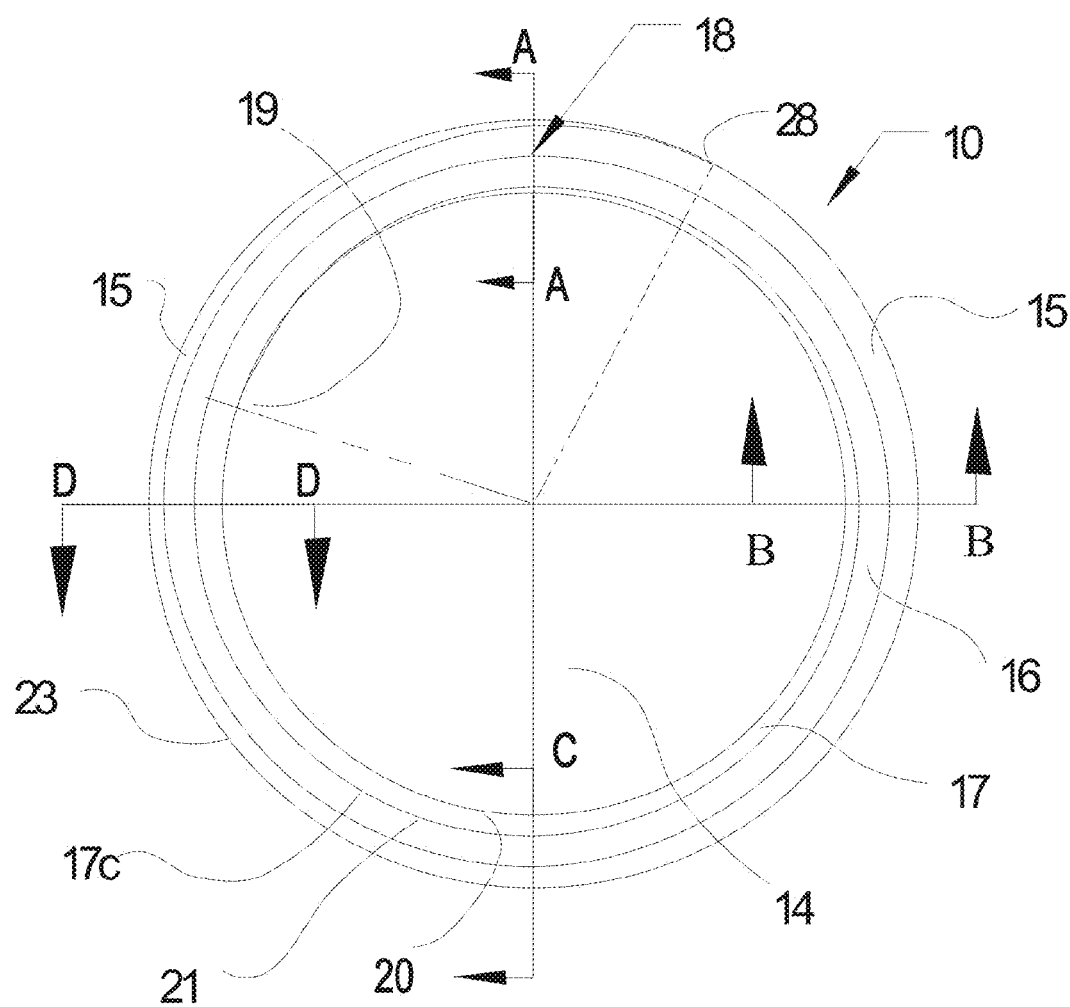

FIG. 10E shows an end view of an anti-cross thread fastener having a lead thread of the present invention. The lead end 14 of the male fastener member 10 is clearly visible in this view. The outer periphery of the lead end 14 is defined by the standard root diameter 20. From helix termination point 19, the lead thread 17 grows in height as it winds around the fastener one-and-one-fifth turns in a clockwise direction until it blends into the anti-cross thread 16 at the blend point 18. The lead thread crest 21 grows in height at a constant rate. The anti-cross thread crest 21 is mostly constant in height until it grows to blend into the fastening thread 15 at blend point 28. The fastening thread crest 23 has the greatest height.

FIG. 10A illustrates a cross-sectional view of the threads taken at A-A in FIG. 10E. In FIG. 10A, two windings of the lead thread 17 are shown adjacent one winding of the anti-cross thread 16. The shorter winding of the lead thread 17, shown at the left of FIG. 10A, is approximately ⅙ its full height. The taller winding of the lead thread 17, shown in the middle of FIG. 10A, is its full height because it is at the blend point 18 with the anti-cross thread 16, wherein both the full height of the lead thread 17 and the height of the anti-cross thread 16 are slightly shorter than the pitch diameter 24 of the fastening thread 15 (not shown in FIG. 10A). For purposes of illustration, a fastening thread profile 25 is shown by a dotted line superimposed over the taller winding of the lead thread 17 so that the relative sizes and profiles may be readily apparent.

In this embodiment, the lead thread 17 has a broadly curved profile as it progresses around the thread helix 11. The lead thread 17 maintains an essentially constant radially curved surface from root to root through its crest 17*c*. The crest 17*c* of its profile in any axial section is the highest point on a curve of essentially the same radius R in any such section. The radius R of the curve defining the lead thread profile is determined by extending the curve from each root at points that would be essentially tangent to the imaginary flanks of a standard thread profile superimposed over the lead thread profile. This is done where the lead thread 17 is the tallest, i.e., at the blend point 18, where the height of the lead thread 17 is just below the pitch line 24 of the fastener. The radius R remains essentially constant throughout the length of the lead thread 17, as the height of the thread profile is reduced as it extends from the blend point 18 to the helix termination point 19, so that the lead thread 17 has the same curvature to its the profile in all sections. As such, the width of the lead thread 17 is at its maximum at the blend point 18 and decreases as its height decreases, until its width is zero at the helix termination point 19.

The lead thread 17 of the embodiment shown in FIGS. 10A-10E also maintains its proximity to the root its shares with the anti-cross thread 16. As the lead thread 17 becomes smaller as it winds around the fastener from the blend point 18, it remains essentially anchored to the root of the adjacent anti-cross thread 16 of the helix 11.

FIG. 10A illustrates a cross-sectional view of the threads taken at A-A in FIG. 10E. At the blend point 18, the median line extending vertically through the radially curved lead thread 17 is located on the vertical center line of fastening thread profile 25, which is also the center line of the anti-cross thread 16 at the blend point 18. As the lead thread 17 winds around the fastener toward the helix termination point 19, the vertical median line of the lead thread profile diverges from the vertical center line of fastening thread profile 25 and gradually approaches the thread root of adjacent anti-cross thread 16 for one full turn and approaches the thread root that it shares with itself for another one fifth turn of the lead thread helix. At the helix termination point 19, the median line of the lead thread 17 approximately intersects the median of adjacent root. At the helix termination point 19, the profile of the lead thread 17 is reduced such that its height and width have reached essentially zero, while its position axially on the male fastener member 10 has approximately reached the root of the adjacent winding of the lead thread 17. This has the effect of anchoring root 17*b* of the lead thread 17 to the root of the adjacent thread, while the opposite root 17*a* of the lead thread 17 leaves the opposite root of the fastening thread profile 25 and gradually approaches the root of the adjacent anti-cross thread 16. In this manner, the lead thread crest 17*c* forms an essentially annular ring around the male fastener member 10, within the envelope of the helix path of the fastening thread profile 25.

FIG. 10D illustrates a cross-sectional view of the threads taken at D-D in FIG. 10E. At this position around the male fastener member 10 the lead thread 17 is adjacent the anti-cross thread 16 so that lead thread root 17*b* is shared with the root of the anti-cross thread 16. A fastening thread profile 25 and an anti-cross thread profile 26 are shown in dotted lines and are superimposed over the lead thread 17, so that the relative sizes and profiles may be readily apparent. At this position, the lead thread 17 is approximately 79% of its greatest height. The radius R of the curve that defines the profile of the lead thread 17 from root 17*a* through the lead thread crest 17*c* to the other root 17*b* is the same as the radius of the curved lead thread profile at the blend point shown in FIG. 10A. The lead thread root 17*b* continues to be shared with the root of the anti-cross thread 16, while the opposite lead thread root 17*a* has shifted from a position similar to where the root of the stand thread would be as indicated by the superimposed fastening thread profile 25.

FIG. 10C illustrates a cross-sectional view of the threads taken at C-C in FIG. 10E. At this position around the male fastener member 10 the lead thread 17 is adjacent the anti-cross thread 16 so that lead thread root 17*b* is shared with the root of the anti-cross thread 16. A fastening thread profile 25 and an anti-cross thread profile 26 are shown in dotted lines and are superimposed over the lead thread 17 so that the relative sizes and profiles may be readily apparent. At this position, the lead thread 17 is approximately 58% of its greatest height. The radius R of the curve that defines the profile of the lead thread 17 from root 17*a* through the lead thread crest 17*c* to the other root 17*b* is the same as the radius of the curved lead thread profile at the blend point shown in FIG. 10A. The lead thread root 17*b* continues to be shared with the root of the anti-cross thread 16, while the opposite lead thread root 17*a* has shifted further from a position similar to where the root of the stand thread would be as indicated by the superimposed fastening thread profile 25.

FIG. 10B illustrates a cross-sectional view of the threads taken at B-B in FIG. 10E. At this position around the male fastener member 10 the lead thread 17 is adjacent the anti-cross thread 16 so that lead thread root 17*b* is shared with the root of the anti-cross thread 16. A fastening thread profile 25 and an anti-cross thread profile 26 are shown in dotted lines and are superimposed over the lead thread 17 so that the relative sizes and profiles may be readily apparent. At this position, the lead thread 17 is approximately 37% of its greatest height. The radius R of the curve that defines the profile of the lead thread 17 from root 17*a* through the lead thread crest 17*c* to the other root 17*b* is the same as the radius of the curved lead thread profile at the blend point shown in FIG. 10A. The lead thread root 17*b* continues to be shared with the root of the anti-cross thread 16, while the opposite lead thread root 17*a* has shifted further from a position similar to where the root of the stand thread would be as indicated by the superimposed fastening thread profile 25.

Referring again to FIG. 10A, a shorter portion of the lead thread 17 is visible at the left side of the figure. Because the lead thread 17 extends for one-and-one-fifth turns of the helix, two windings of the lead thread 17 are visible in FIG. 10A: the full-height winding of the lead thread 17 is in the middle of the figure; and the nearly terminated winding of the lead thread 17 is at the left side of the figure. The root 17*b* of the nearly terminated winding is shared with the root 17*a* of the full-height winding of the lead thread 17. Even at this very low height, the lead thread 17 of the nearly terminated winding has a curved profile having a radius R that is the same as the radius of the curved profiles at the other positions.

The embodiment of the invention illustrated in FIGS. 10A-10E has a lead thread 17 that combines: a curved profile, a constant maximum rate of peak height change, and a non-helical winding around the fastener shank. These combined features may allow the lead thread 17 to slide along and over the lead thread of an internally threaded female member (not shown) without engaging any depressions and/or grooves in the peak of the internal female lead thread. The lead thread 17 of the male fastener member 10 may thereby allow the adjacent anti-cross thread 16 to more effectively correct any angular or axial misalignment with an internally threaded female member (not shown) so that cross threading and/or false threading may be avoided.

Figure 11A:
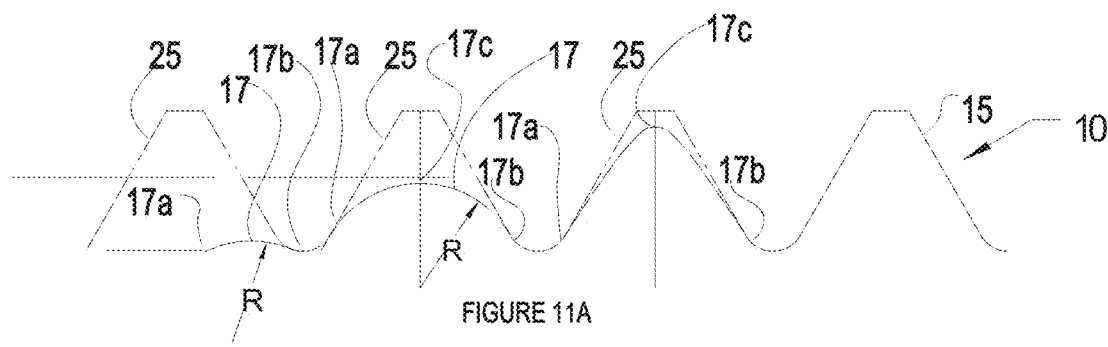
FIGS. 11A-11E illustrate cross-sectional side views and an end view of a male fastener member of the present invention having a fastener thread and a lead thread in the same helix, wherein the lead thread is anchored to the next winding.
Figure 11B:
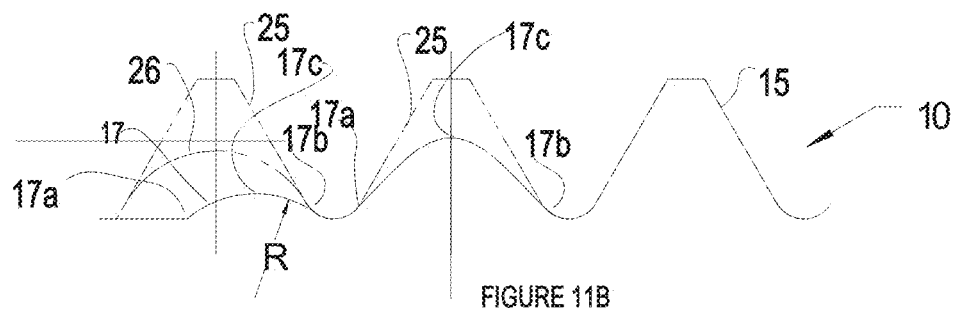
Figure 11C:
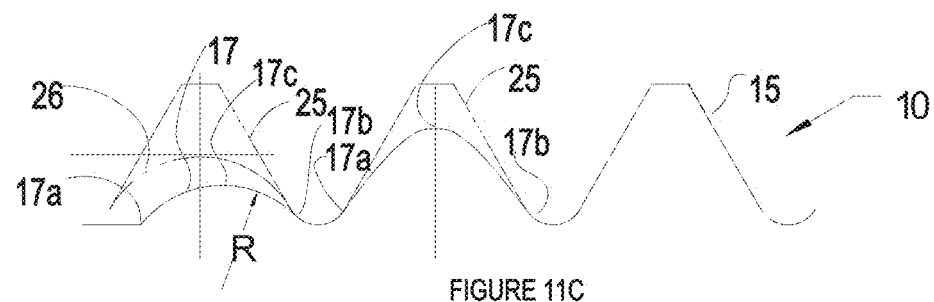
Figure 11D:
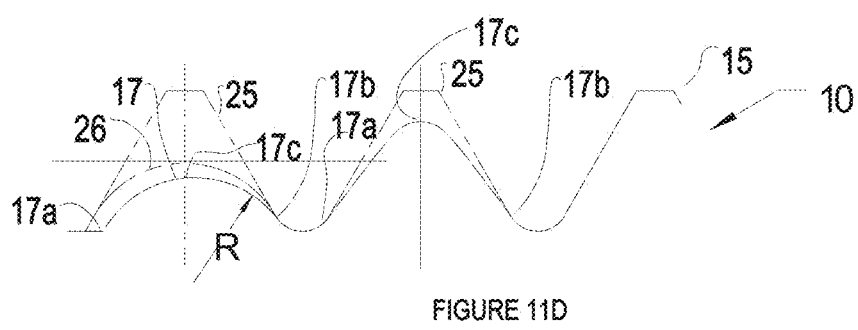
Figure 11E:
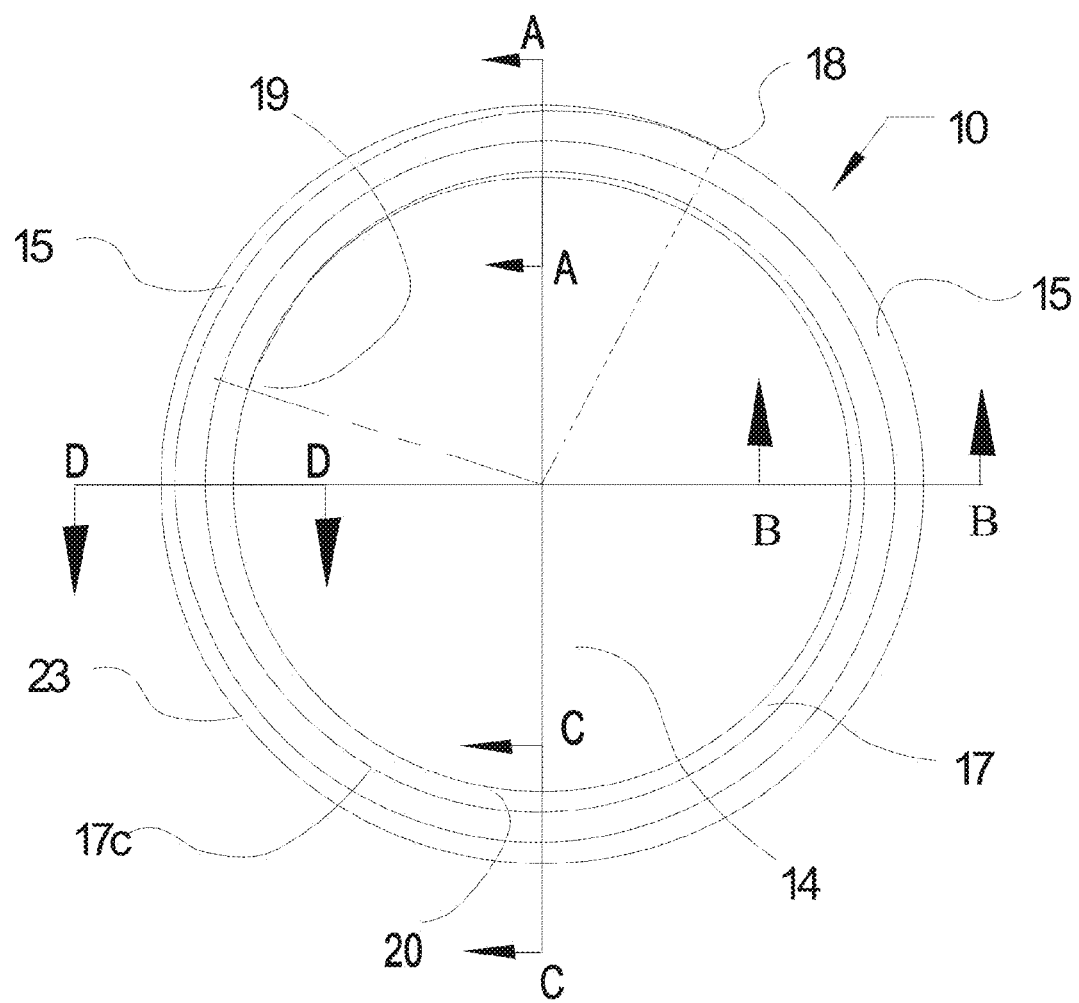

FIGS. 11A-11E illustrate another embodiment of a male fastener member having a lead thread. FIG. 11E is a view of the lead end 14, and FIGS. 11A-11D are cross-sectional views taken in an axial direction at the positions indicated in FIG. 11E. This male fastener member 10 has windings of a fastening thread 15 and more than two-and-one-quarter windings of a lead thread 17. As shown in FIG. 11E, the lead thread 17 starts at a helix termination point 19 where its height is zero and grows in height as it winds around the shank until it reaches its full-height at blend point 18 where the lead thread 17 blends into the fastening thread 15.

FIG. 11A illustrates a cross-sectional view of the threads taken at A-A in FIG. 11E. Referring to FIG. 11A, a shorter portion of the lead thread 17 is visible at the left side of the figure. Because the lead thread 17 extends for more than two-and-one-quarter turns of the helix, three windings of the lead thread 17 are visible in FIG. 11A: a shorter winding at the left, a medium winding in the middle, and a taller winding at the right. As the lead thread 17 winds around the fastener from the helix termination point 19, it gets taller and remains anchored to the root it shares with the medium sized winding of itself for one full turn of the lead thread helix. At the helix termination point 19, the lead thread 17 approximately intersects the median of the adjacent root. At the helix termination point 19, the profile of the lead thread 17 is reduced such that its height and width are essentially zero, while its position axially on the male fastener member 10 is approximately at the root of the adjacent winding of the lead thread 17. This has the effect of anchoring root 17b of the lead thread 17 to the root of the adjacent winding, while the opposite root 17a of the lead thread 17 has left the opposite root of the fastening thread profile 25 (shown by dotted lines) and gradually approaches the anchored root 17b. In this manner, the lead thread crest 17c forms an essentially annular ring around the male fastener member 10, within the envelope of the helix path of the fastening thread profile 25. At cross-section A-A, the shortest lead thread winding is about 8.3% of full height, the medium lead thread winding is about 52.7% of full height, and the tallest lead thread winding is about 97.2% of full height.

FIG. 11B illustrates a cross-sectional view of the threads taken at B-B in FIG. 11E. At this position around the male fastener member 10 the shorter winding of the lead thread 17 is adjacent the taller winding of the lead thread 17 so that the shorter lead thread root 17b is shared with the taller lead thread root 17a. Fastening thread profiles 25 are shown in dotted lines and are superimposed over the windings of the lead thread 17 so that the relative sizes and profiles may be readily apparent. At cross-section B-B, the shorter lead thread winding is about 19.4% of full height and the taller lead thread winding is about 63.9% of full height. The radius R of the curve that defines the profile of the shorter winding of lead thread 17 from root 17a through the lead thread crest 17c to the other root 17b is the same as the radius of an arc (similar to anti-cross thread profile 26) that would extend from root to root of the fastening thread profile 25. The lead thread root 17b of the shorter winding continues to be shared with the root 17a of the taller winding of the lead thread 17, while the opposite lead thread root 17a is shifted from a position similar to where the root of the standard thread would be as indicated by the superimposed fastening thread profile 25.

FIG. 11C illustrates a cross-sectional view of the threads taken at C-C in FIG. 11E. At this position around the male fastener member 10 the shorter winding of the lead thread 17 is adjacent the taller winding so that lead thread root 17b of the shorter winding is shared with the root 17a of the taller winding of the lead thread 17. Fastening thread profiles 25 are shown in dotted lines and are superimposed over the windings of the lead thread 17 so that the relative sizes and profiles may be readily apparent. At cross-section C-C, the shorter lead thread winding is about 30.5% of full height and the taller lead thread winding is about 75.0% of full height. The lead thread profile may comprise a curved surface that has a radius R that is the same as the radius of an arc (similar to anti-cross thread profile 26) that would extend from root to root of the fastening thread profile 25.

FIG. 11D illustrates a cross-sectional view of the threads taken at D-D in FIG. 11E. At this position around the male fastener member 10 the shorter winding of the lead thread 17 is adjacent the taller winding so that lead thread root 17b of the shorter winding is shared with the root 17a of the taller winding of the lead thread 17. Fastening thread profiles 25 are shown in dotted lines and are superimposed over the windings of the lead thread 17 so that the relative sizes and profiles may be readily apparent. At cross-section D-D, the shorter lead thread winding is about 41.7% of full height and the taller lead thread winding is about 86.1% of full height. The lead thread profile of the taller winding may comprise a combination of curved and straight surfaces depending on the configuration of the rolling dies used to manufacture the lead thread. In particular, the lead thread profile of the taller winding may comprise a combination between an anti-cross thread and a standard thread as shown in FIG. 11D. The shorter winding of the lead thread may have a curve with a radius that is the same as the radius of an arc (similar to anti-cross thread profile 26) that would extend from root 17a to root 17b.

Figure 12A:
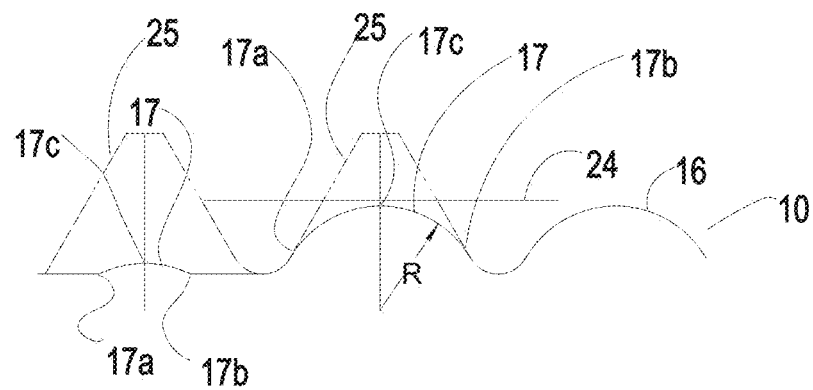
FIGS. 12A-12E illustrate cross-sectional side views and an end view of a male fastener member of the present invention having an anti-cross thread and a lead thread in the same helix, wherein the lead thread is not anchored to the anti-cross thread and is in the middle of a fastening thread profile.
Figure 12B:
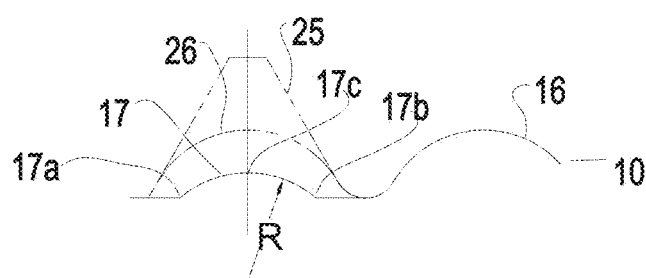
Figure 12C:
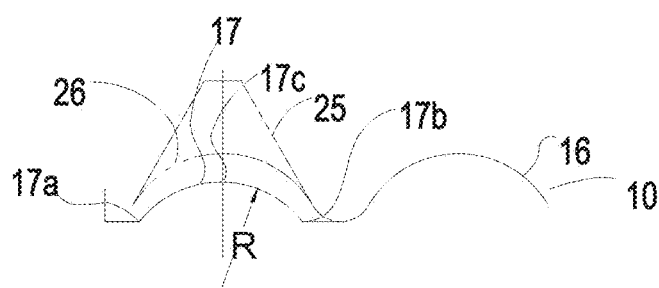
Figure 12D:
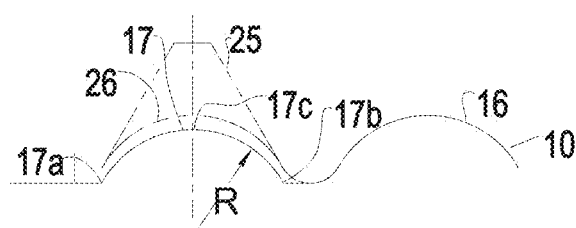
Figure 12E:
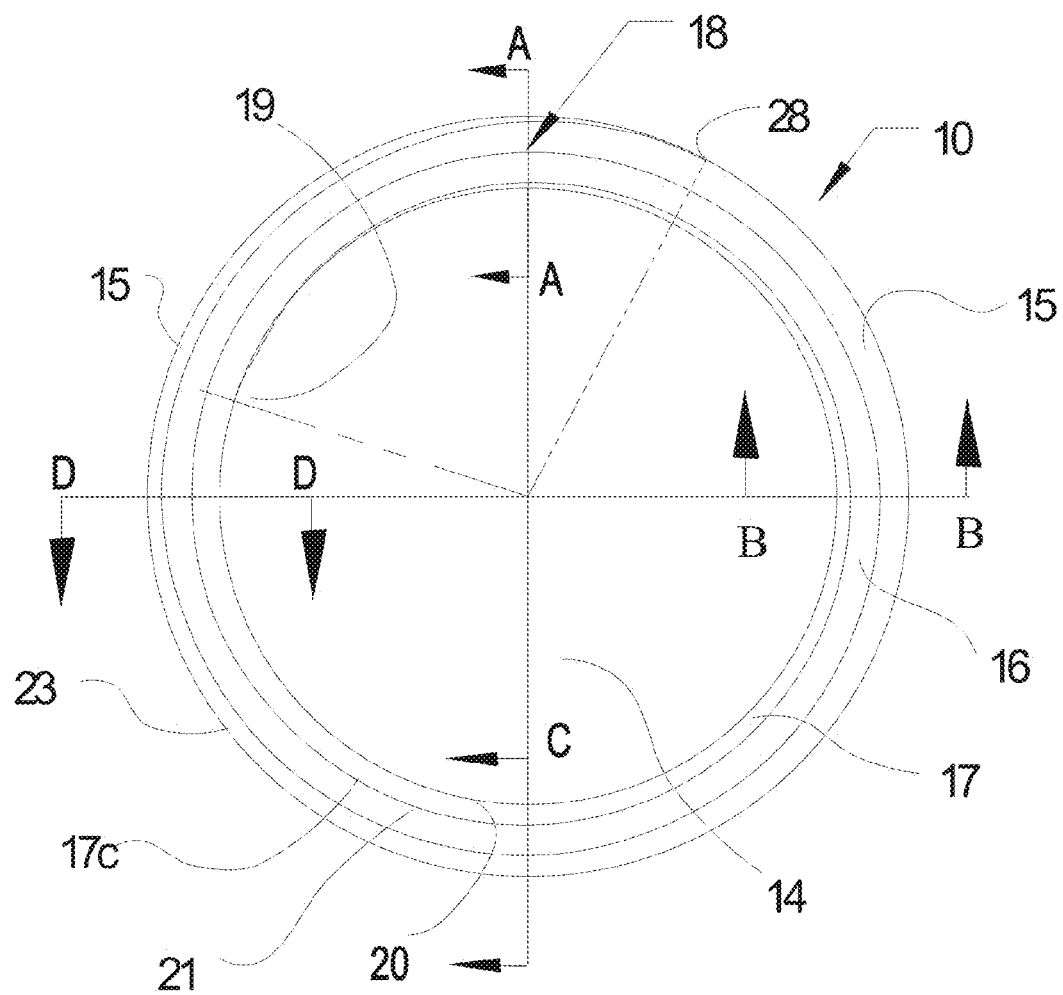

FIGS. 12A-12E illustrate another embodiment of a male fastener member having a lead thread. FIG. 12E is a view of the lead end 14, and FIGS. 12A-12D are cross-sectional views taken in an axial direction at the positions indicated in FIG. 12E. This male fastener member 10 has windings of a lead thread 17, an anti-cross thread 16, and a fastening thread 15. As shown in FIG. 12E, the lead thread 17 starts at a helix termination point 19 where its height is zero, and grows in height as it winds around the shank until it reaches its full-height at blend point 18, where the lead thread 17 blends into the anti-cross 16.

FIG. 12A illustrates a cross-sectional view of the threads taken at A-A in FIG. 12E. Referring to FIG. 12A, a shorter portion of the lead thread 17 is visible at the left side of the figure. Because the lead thread 17 extends for more than one turn of the helix, two windings of the lead thread 17 and one winding of the anti-cross thread 16 are visible in FIG. 12A: a shorter winding of the lead thread 17 at the left, a taller winding of the lead thread 17 in the middle and an anti-cross thread winding at the right. As the lead thread 17 winds around the fastener from the helix termination point 19, it gets taller but in this embodiment, it does not remain anchored to the root of the adjacent winding of itself. At the helix termination point 19, the lead thread 17 is approximately position in the middle of fastening thread profile 25 (shown in dotted line and superimposed over the lead thread 17). At the helix termination point 19, the profile of the lead thread 17 is reduced such that its height and width are essentially zero, while its position axially on the male fastener member is separate and apart from the root of the adjacent winding of the lead thread 17. At cross-section A-A, the shorter lead thread winding is about 16.7% of full height, the taller lead thread winding is about 100% of full height for the lead thread 17, and the anti-cross thread 16 is its full height. As shown in FIGS. 12A and 12E, the lead thread 17 is at its full height at the blend point 18, where it blends into the anti-cross thread 16. As shown in FIG. 12E, the anti-cross thread 16 blends into the fastening thread 15 at a second blend point 28.

FIG. 12B illustrates a cross-sectional view of the threads taken at B-B in FIG. 12E. At this position around the male fastener member 10 the lead thread 17 does not share a root with the adjacent anti-cross thread 16 because there is a space separating them. A fastening thread profile 25 is shown in dotted lines and is superimposed over the winding of the lead thread 17 so that the relative sizes and profiles may be readily apparent. At cross-section B-B, the lead thread is about 37.5% of its full height. The radius R of the curve that defines the profile of the lead thread 17 from root 17a through the lead thread crest 17c to the other root 17b is the same as the radius of an arc (similar to anti-cross thread profile 26) that would extend from root to root of the fastening thread profile 25.

FIG. 12C illustrates a cross-sectional view of the threads taken at C-C in FIG. 12E. At this position around the male fastener member 10 the lead thread 17 still does not share a root with the adjacent anti-cross thread 16. A fastening thread profile 25 is shown in dotted lines and is superimposed over the windings of the lead thread 17 so that the relative sizes and profiles may be readily apparent. At cross-section C-C, the lead thread is about 58.33% of full height for the lead thread 17. The lead thread profile may comprise a curved surface that has a radius R that is the same as the radius of an arc (similar to anti-cross thread profile 26) that would extend from root to root of the fastening thread profile 25.

FIG. 12D illustrates a cross-sectional view of the threads taken at D-D in FIG. 12E. At this position around the male fastener member 10 the lead thread 17 is still spaced apart from the adjacent anti-cross thread 16. A fastening thread profile 25 is shown in dotted lines and is superimposed over the lead thread 17, so that the relative sizes and profiles may be readily apparent. At cross-section D-D, the shorter lead thread is about 79.2% of full height. The lead thread profile may have a curve with a radius that is the same as the radius of an arc (similar to anti-cross thread profile 26) that would extend from root 17a to root 17b.

Figure 13A:
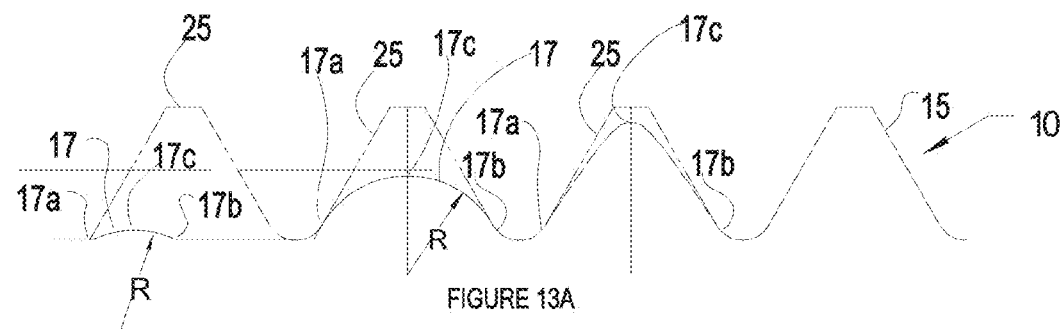
FIGS. 13A-13E illustrate cross-sectional side views and an end view of a male fastener member of the present invention having a fastener thread and a lead thread in the same helix, wherein the lead thread is not anchored to the next winding and is as far as possible from the next winding while still being within a fastening thread profile.
Figure 13B:
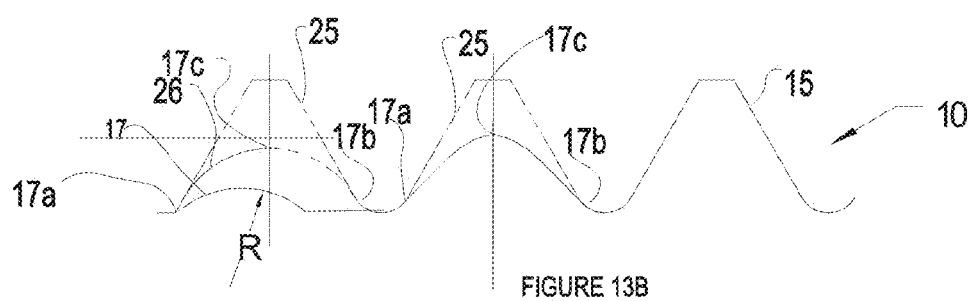
Figure 13C:
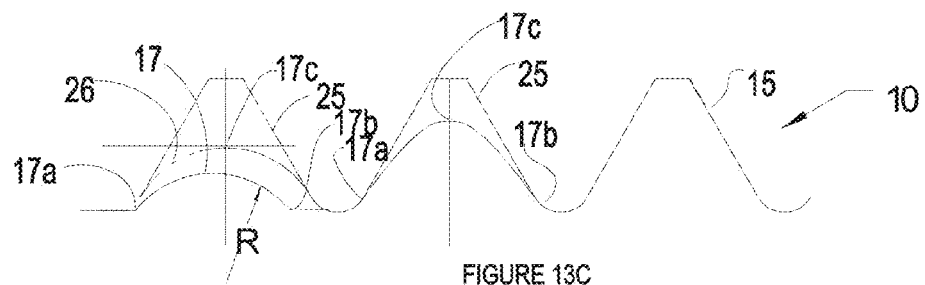
Figure 13D:
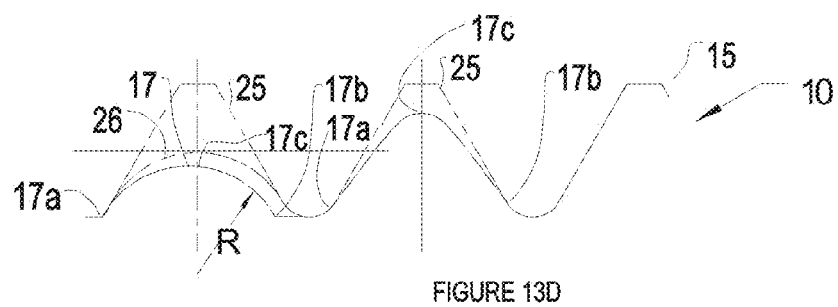
Figure 13E:
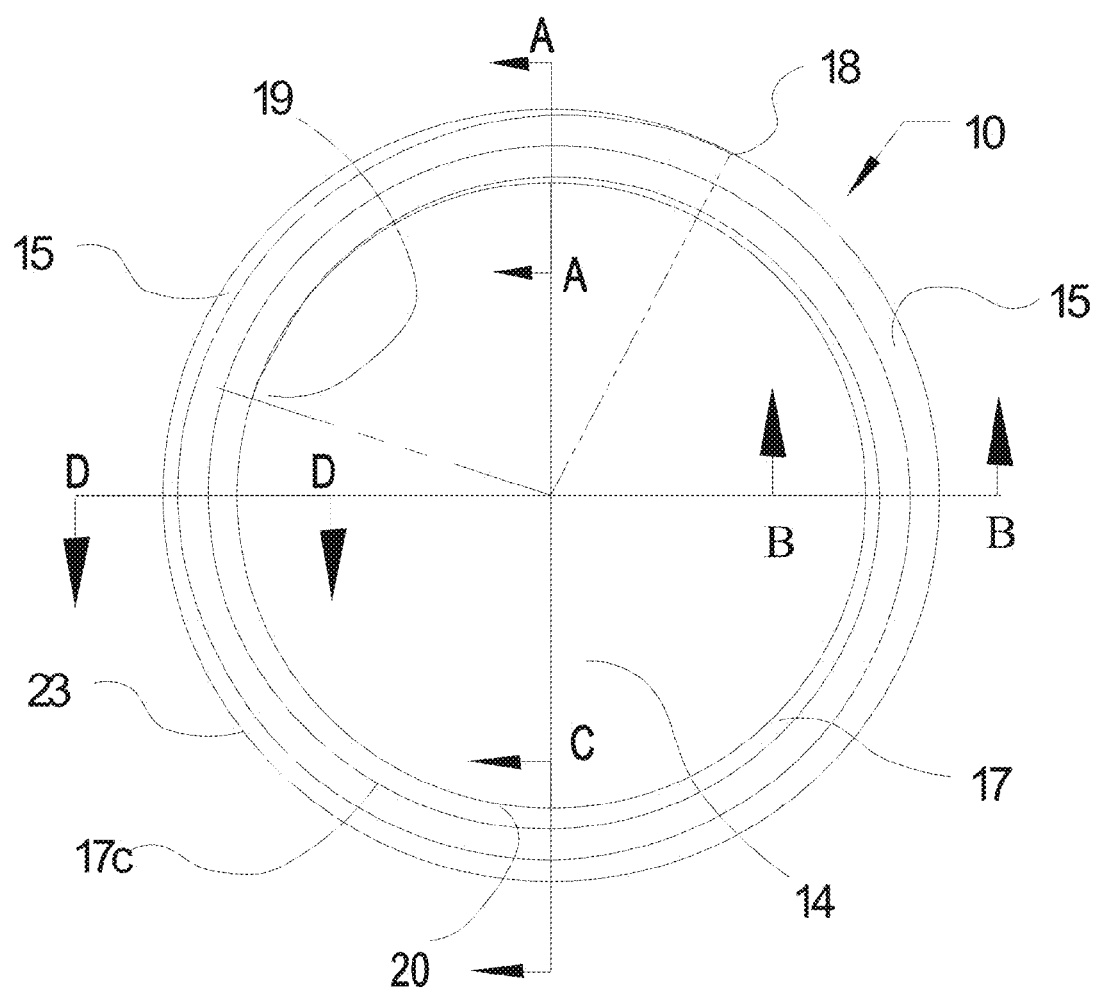
Figure 14A:
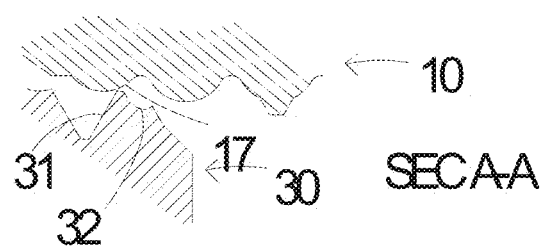
FIGS. 14A-14E show cross-sectional side views a male fastener member of the present invention being instead into the female fastener, wherein the male lead thread of the male fastener member is passing over a groove in the crest of the female lead thread to resist or prevent false threading.
Figure 14B:
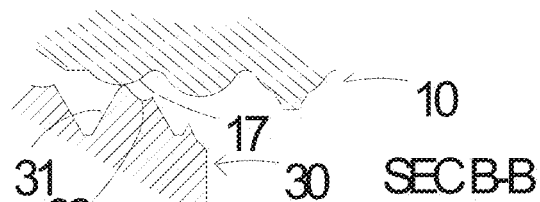
Figure 14C:
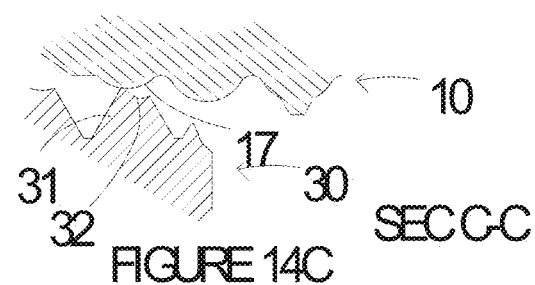
Figure 14D:
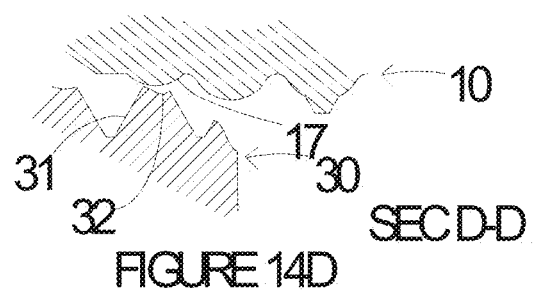
Figure 14E:
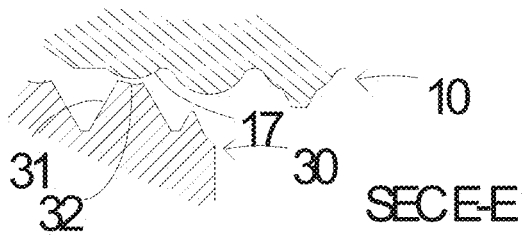
Figure 14F:
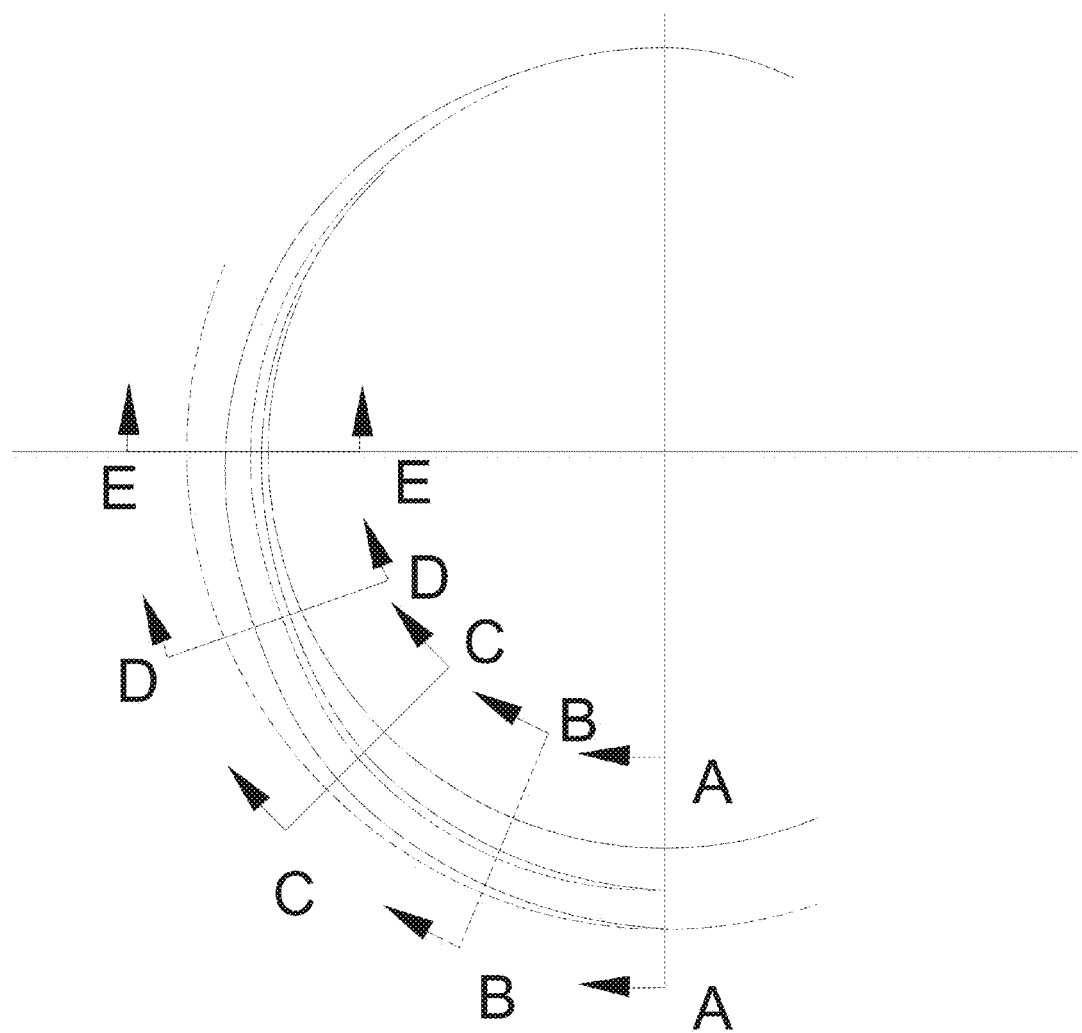
FIG. 14F is an end view of a female fastener member having a lead thread.

FIGS. 13A-13E illustrate another embodiment of a male fastener member having a lead thread. FIG. 13A illustrates a cross-sectional view of the threads taken at A-A in FIG. 13E. Referring to FIG. 13A, a shorter portion of the lead thread 17 is visible at the far left side of the figure. Because the lead thread 17 extends for more than two-and-one-quarter turns of the helix, three windings of the lead thread 17 are visible in FIG. 13A: a shorter winding at the far left, a medium winding in the middle, and a taller winding at the right. As the lead thread 17 winds around the fastener from the helix termination point 19, it gets taller and remains as far as possible from the medium sized winding of itself for one full turn of the lead thread helix, while the small winding stays within a fastening thread profile 25 (shown in a dotted line superimposed over the lead thread. FIG. 13B illustrates a cross-sectional view of the threads taken at B-B in FIG. 13E. At this position around the male fastener member 10 the shorter winding of the lead thread 17 is as far as possible from the adjacent taller winding of the lead thread 17. FIG. 13C illustrates a cross-sectional view of the threads taken at C-C in FIG. 13E. At this position around the male fastener member 10 the shorter winding of the lead thread 17 is still as far as possible from the adjacent taller winding of the lead thread 17, while it stays within a fastening thread profile 25 (shown in a dotted line superimposed over the lead thread). FIG. 13D illustrates a cross-sectional view of the threads taken at D-D in FIG. 13E. At this position around the male fastener member 10 the shorter winding of the lead thread 17 is not yet sharing a root with the adjacent taller winding.

In some embodiments of the invention, over the entire length of the lead thread, approximately one-and-one-fifth turns of the helix, its profile may be a curve at its peak, wherein the curve has the same radius at every axial section, such that it in any section its profile effectively bridges any groove present in the internal lead thread of a female fastener member.

While alternative embodiments of the lead thread do not have a height that grows at a constant rate as it winds around the shank of the fastener, one aspect of the inventive lead thread is that it does not have localized bumps, points, or sudden increases in lead thread height or contour that might become lodged in and continue to thread into the groove in the peak of an internal lead thread of a female fastener member. Some embodiments of the invention have a lead thread that has a constant growth rate coupled with a uniform profile, which prevents the anti-false lead thread from entering into any grooves present in the internal lead thread of a female fastener member. Embodiments of the invention have a lead thread profile to further allow the lead thread to slide over any grooves present in the internal lead thread of a female fastener member with minimum applied axial force. Thus, the male fastener member may not thread into and/or seize against any peak groove of the female fastener member.

FIGS. 14A-14F show cross-sectional views and an end view of a female fastener member having an internal lead thread and a corresponding male fastener member being inserted therein but without any relative rotation of the members. The female fastener member 30 having an internal lead thread 31 is the same as illustrated in FIGS. 4A-4F. As shown in FIGS. 14A-14E, which are cross-sectional views of the threads at the positions identified in FIG. 14F, the male fastener member 10 may be inserted into the female fastener member without rotational movement. Before the members are revolved relative to each other for engagement of the threads, the lead thread 17 of the male fastener member 10 bridges the differing depths of the groove 32 in the peak of the internal lead thread 31 of the female fastener member 30, without entering into it in any section of the groove 32.

Figure 15A:
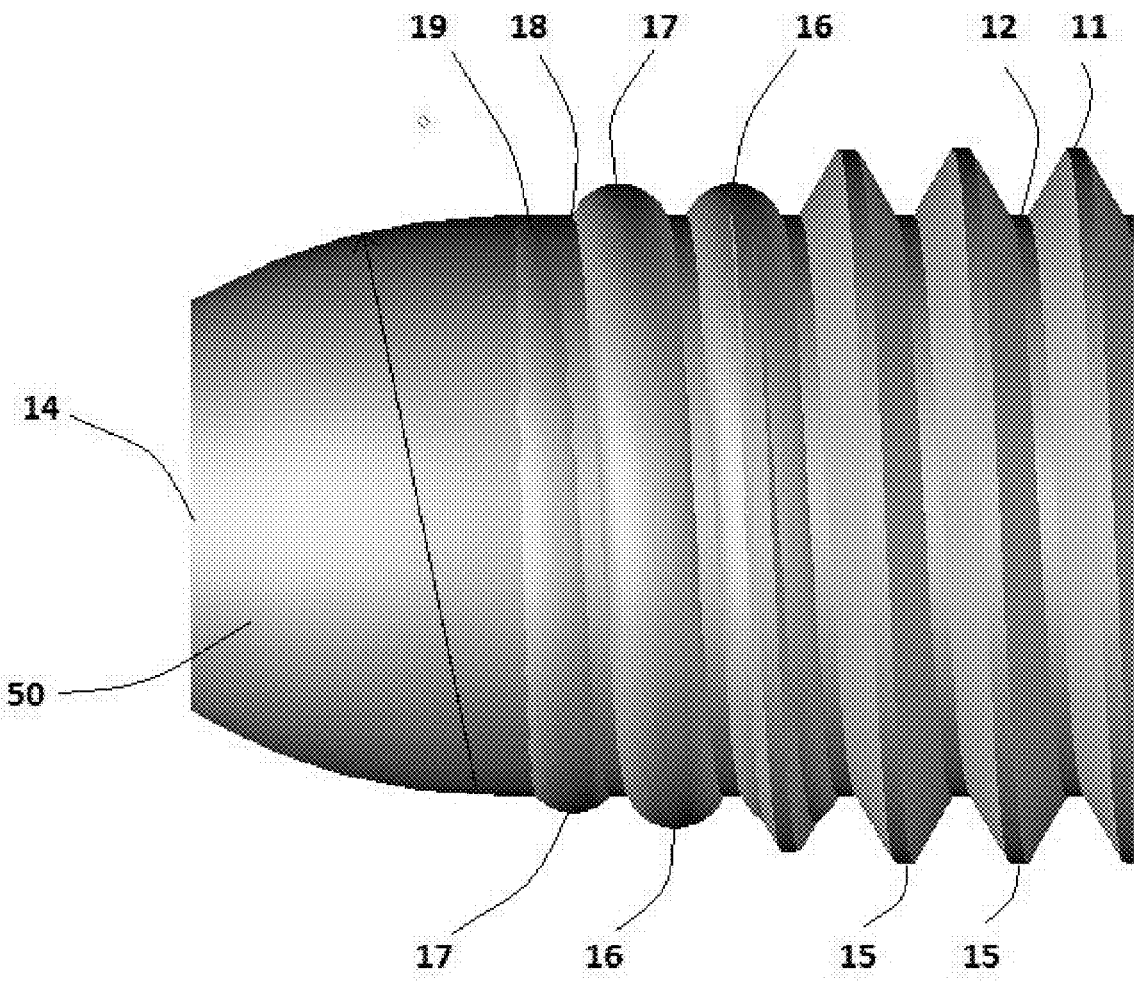
FIGS. 15A-15C show a side view of a male fastener member of the present invention having a lead-in point at the lead end of the shank.
Figure 15B:
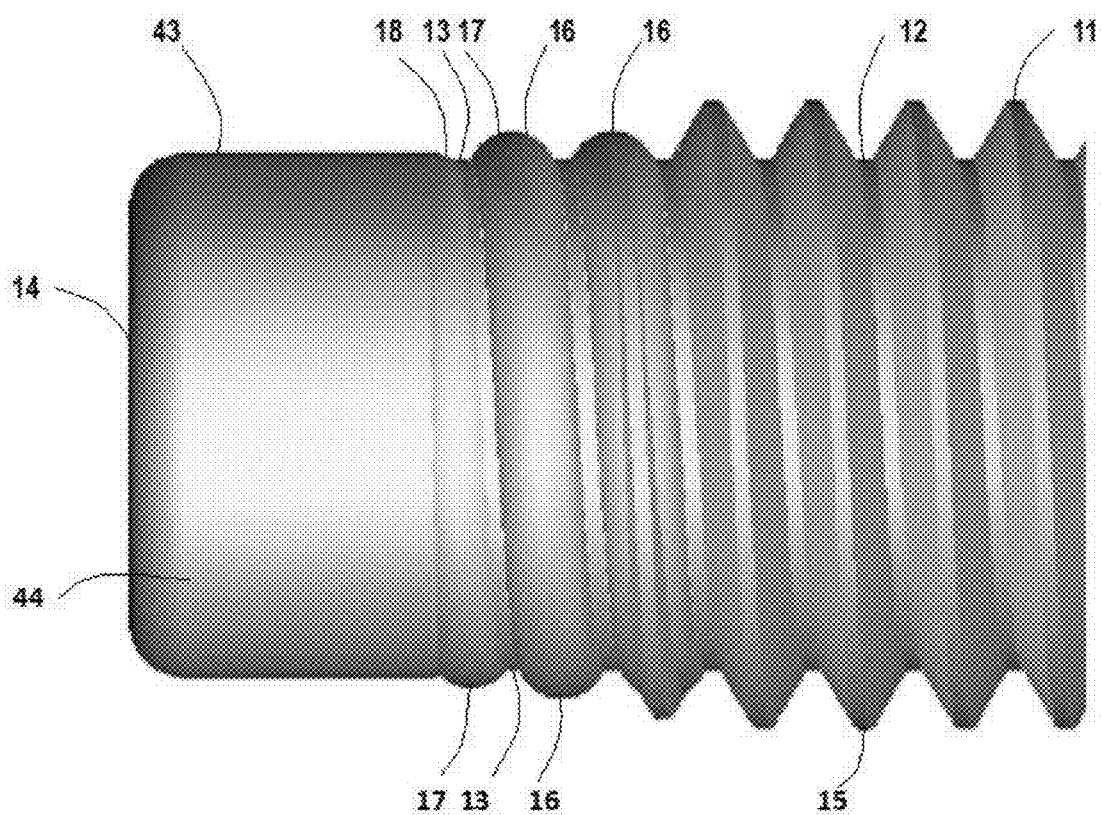

FIGS. 15A-15C show side views of male fastener members of the present invention having a lead thread and various lead-in points. The helix of threads 11 wound around the shank 12 of the male fastener member 10 may take several distinctly different profiles over its length, as it progresses about the shank 12 from the head (not shown) to the lead end 14 of the fastener. The male fastener member 10 may have several windings of fastening thread 15, wherein the fastening thread 15 may be a standard thread (see FIG. 1) or any other thread known to persons of skill in the art. The fastening thread 15 may be followed, as the helix 11 winds toward the lead end 14, by a short section of anti-cross thread 16, wherein the fastening thread 15 blends into the anti-cross thread 16 on the same helix 11. The anti-cross thread 16 has a profile that imparts anti-cross thread function to that section of the helix, as at least a portion of one winding of the thread helix has a transitionally curved surface from the minor diameter to the major diameter. A detailed description of an anti-cross thread 16 is provided in U.S. Pat. No. 5,730,566, incorporated herein in its entirety by reference. The anti-cross thread 16 may be followed on the helix 11 by lead thread 17 as described in detail with reference to FIGS. 10A-10E. These thread profiles, no matter their specific localized shape and profile, may be contained within the envelope defined by the profile of a fastening thread 15. At the lead end 14, a lead-in point 50 is formed on the male fastener member 10. A detailed description of a lead-in point 50 is provided in U.S. Pat. No. 6,062,786, incorporated herein in its entirety by reference. In FIG. 15A, the lead-in point 50 tapers from a larger diameter at the lead thread 17 to a smaller diameter at the tip. In FIG. 15B, the lead-in point 50 is a cylindrical shape with a diameter slightly larger than the minimum diameter of the fastening thread 15. In FIG. 15C, the lead-in point 50 is a cylindrical shape with a diameter slightly smaller than the minimum diameter of the fastening thread 15. In other embodiments, any lead-in point known to persons of skill in the art may be formed on the lead end of the male fastener member. Still other embodiments may comprise a lead-in point that is larger in diameter than the minimum diameter at the root of the lead thread and/or the fastening thread. Where a larger diameter lead-in point is added to a male fastener member, the lead thread may be relatively shorter where the rate of change of the height of the lead thread is the same. A relatively shorter lead thread may be the result of the lead thread terminating on a higher surface, i.e., the larger diameter lead-in point.

Figure 15:
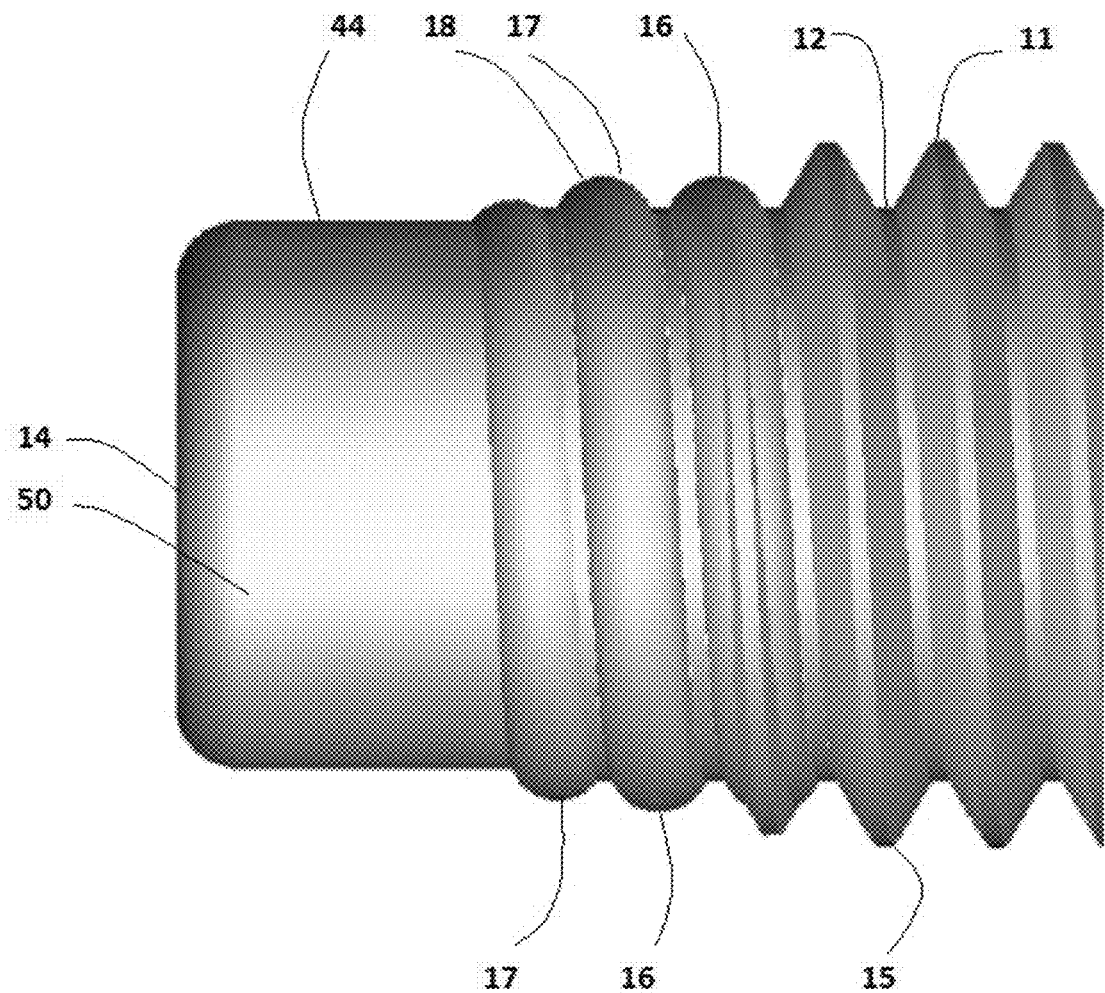

The minimum diameter of the lead thread 17 may be smaller or larger than the minimum diameter of an anti-cross thread 16 or a fastening thread 15. For example, as shown in FIG. 15, the lead-in point 50 may have a larger outside diameter than the minimum diameter of the fastening thread 15. The minimum diameter of the lead thread 17 may be largest at the helix termination point 19, and the minimum diameter of the lead thread 17 may get smaller as the lead thread winds around the shank to the blend point 18, and may get smaller still with each winding from the lead thread 17, through an anti-cross thread 16 until it gets to the minimum diameter of the fastening thread 15. In a similar embodiment, the minimum diameter may get smaller, but the fastener does not have a lead-in point. In alternative embodiments, with or without a lead-in point, the minimum diameter may get larger as the lead thread 17 winds from the helix termination point 19 toward a blend point 18 and may get larger still beyond the blend point 18. In alternative embodiments, the minimum diameter stair steps smaller or larger from the lead thread 17 to the next thread, but may remain constant for the entire winding of the lead thread 17.

Figure 16A:
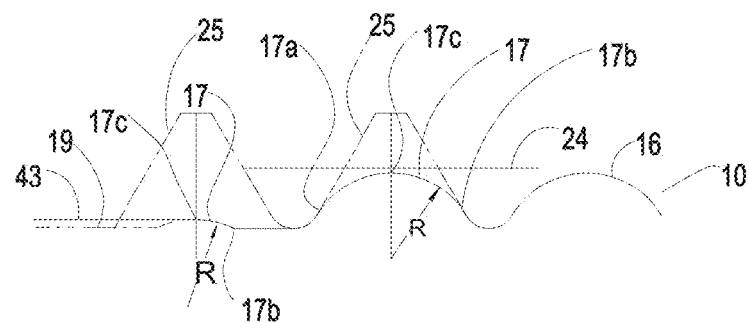
FIGS. 16A-16D illustrate cross-sectional side views of male fasteners having lead in points.
Figure 16B:
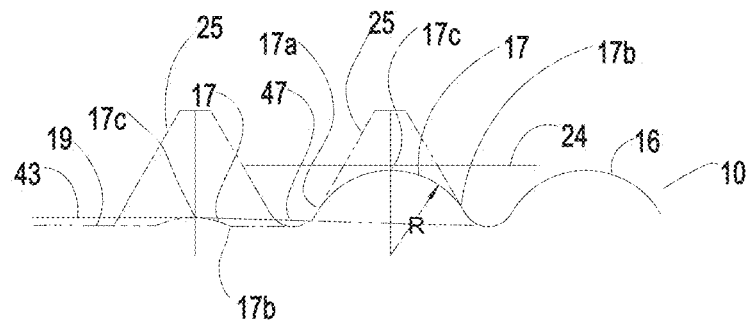
Figure 16C:
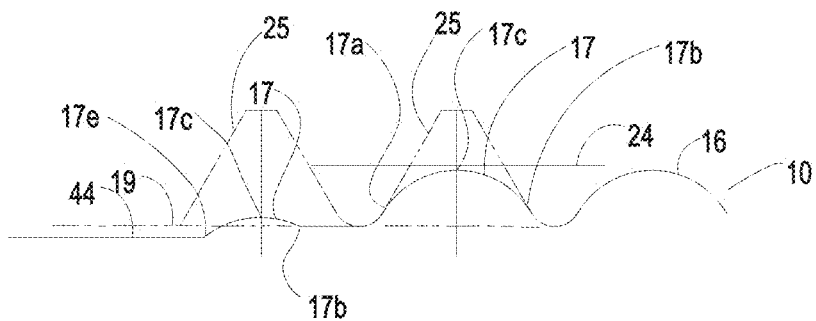
Figure 16D:
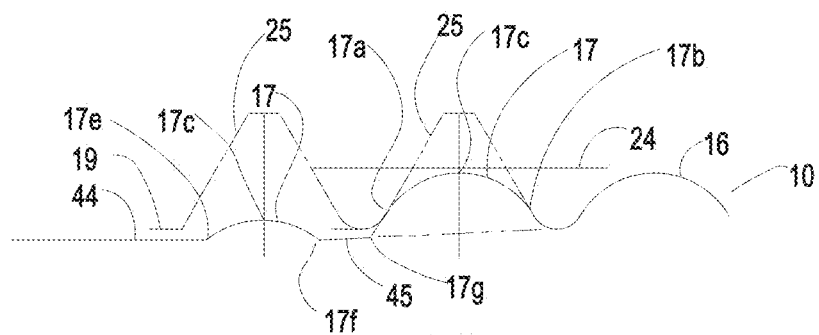

FIGS. 16A-16B illustrate cross-sectional side views of different lead threads 17 and anti-cross threads 16 on different male fastener members of the present invention, wherein the different fasteners have different minimum diameters around the lead threads 17. These configurations illustrate that it is possible to change the diameter at the roots of the lead thread without changing the anti-false threading functionality of the lead thread. In FIG. 16A, the fastener 10 has a cylindrical lead-in point 43 that is larger in diameter than the minimum diameter of the anti-cross thread 16 and only extends to the lead thread 17, such that the lead thread flank 17b exists on the right side of the lead thread 17 but there is no flank on the other side. In FIG. 16B, the fastener 10 has a cylindrical lead-in point 43 that is larger in diameter than the minimum diameter of the anti-cross thread 16 and it extends all the way to the anti-cross thread 17, such that there is no lead thread 17 protruding up through the lead-in point 43. This illustrates how a lead thread 17 can be shortened from one and one fifth windings to about one winding where a portion of the lead thread is covered up by a relatively larger diameter lead-in point 43. In FIG. 16C, the fastener 10 has a cylindrical lead-in point 44 that is smaller in diameter than the minimum diameter of the anti-cross thread 16 and the lead-in point 44 only extends to the lead thread 17, such that the lead thread flank 17e is larger than the lead thread flank 17b. In FIG. 16D, the fastener 10 has a cylindrical lead-in point 44 that is smaller in diameter than the minimum diameter of the anti-cross thread 16 and the lead-in point 44 extends to the anti-cross thread 16, such that the lead thread flanks 17e and 17f are the same size or nearly the same size.

The present invention, therefore, is well adapted to carry out the objects and attain the ends and advantages mentioned, as well as others inherent therein. While a presently preferred embodiment of the invention has been given for purposes of disclosure, numerous changes in the details or procedures for accomplishing the desired results will readily suggest themselves to those skilled in the art, and which are encompassed within the spirit of the invention and the scope of the appended claims.

What is claimed is:

1. A method for correcting translational misalignment between male and female fastener members to prevent false threading, the method comprising:
    inserting a lead end of a male fastener member into a female fastener member, wherein the female fastener member comprises:
    at least one female fastening thread formed in an interior of the female fastener member,
    at least one female lead thread formed in the interior of the female fastener member, the at least one female lead thread having a groove in the crest, and
    wherein the male fastener member comprises:
    a shank that has a lead end for insertion into the interior of the female fastener member;
    at least one male fastening thread formed on the exterior of the shank as a plurality of thread windings adapted to mate with the at least one female fastening thread;
    at least one male lead thread formed on the exterior of the shank at the lead end that is at least a half winding around the shank and comprises a curved profile defined by an arc having a radius approximately equal to a radius of an arc that is tangent to both flanks of a thread profile of the at least one male fastening thread and below the pitch line of the at least one male fastening thread; and
    rotating the fastener members relative to each other while the at least one male lead thread of the male fastener member passes over and does not thread into the groove in the crest of the at least one female lead thread of the female fastener member.

2. A method for correcting translational misalignment between male and female fastener members to prevent false threading, as claimed in claim 1, wherein the male lead thread is at least a three quarter winding around the shank.

3. A method for correcting translational misalignment between male and female fastener members to prevent false threading, as claimed in claim 1, wherein the male lead thread is at least one-and-one-fifth windings around the shank.

4. A method for correcting translational misalignment between male and female fastener members to prevent false threading, as claimed in claim 1, wherein the male thread profiles at each cross-section between the ends of the male lead thread are defined by arcs having approximately the same radius.

5. A method for correcting translational misalignment between male and female fastener members to prevent false threading, as claimed in claim 1, wherein at least one male lead thread is shortest at a beginning end of the male lead thread winding and tallest at the other end of the male lead thread winding, wherein the male lead thread comprises a crest that has a height that changes at a substantially constant rate between the ends of the male lead thread winding.

6. A method for correcting translational misalignment between male and female fastener members to prevent false threading, as claimed in claim 1, wherein the male lead thread comprises a male lead thread flank that is anchored to the root of an adjacent thread winding along the entire length of the male lead thread.

7. A method for correcting translational misalignment between male and female fastener members to prevent false threading, as claimed in claim 1, wherein the male lead thread comprises a profile that has a height and shape adapted to resist false threading into a groove in the crest of a female lead thread in the interior of a female fastener member.

8. A method for correcting translational misalignment between male and female fastener members to prevent false threading, as claimed in claim 1, wherein a continuous thread helix comprises the at least one male lead thread and the at least one male fastening thread.

9. A method for correcting translational misalignment between male and female fastener members to prevent false threading, as claimed in claim 1, further comprising at least one male anti-cross thread that cams over the female fastening threads of the female fastener member as the male and female fastener members are rotated relative to each other, whereby a longitudinal axis of the shank and a longitudinal axis of the female fastener member become substantially collinearly aligned.

10. A method for correcting translational misalignment between male and female fastener members to prevent false threading, as claimed in claim 1, further comprising at least one male anti-cross thread that has an outside diameter smaller than the major diameter of the at least one male fastening thread, and wherein the at least one male anti-cross thread comprises an exterior surface that is a curved shape approximated by a plurality of flat and curved surfaces and has a profile that fits within a profile of at least one male fastening thread.

11. A method for correcting translational misalignment between male and female fastener members to prevent false threading, as claimed in claim 1, further comprising at least one male anti-cross thread that aligns a longitudinal axis of the shank and a longitudinal axis of the female fastener member, wherein a continuous thread helix comprises the at least one male lead thread, the at least one male anti-cross thread, and the at least one male fastening thread.

12. A method for correcting translational misalignment between male and female fastener members to prevent false threading, as claimed in claim 1, further comprising a lead-in point formed at the lead end of the shank.

13. A method for correcting translational misalignment between male and female fastener members to prevent false threading, the method comprising:
inserting a lead end of a male fastener member into a female fastener member, wherein the female fastener member comprises:
at least one female fastening thread formed in an interior of the female fastener member,
at least one female lead thread formed in the interior of the female fastener member, the at least one female lead thread having a groove in the crest, and
wherein the male fastener member comprises:
a shank that has a lead end for insertion into the interior of the female fastener member;
at least one male fastening thread formed on the exterior of the shank as a plurality of thread windings adapted to mate with the at least one female fastening thread;
at least one male lead thread formed on the exterior of the shank at the lead end that is at least a half winding around the shank and is shortest at a beginning end of the male lead thread winding and tallest at the other end of the male lead thread winding, wherein the at least one male lead thread comprises a crest that has a height that changes at a substantially constant rate between the ends of the male lead thread winding, and wherein the male lead thread comprises a male lead thread flank that is anchored to the root of an adjacent thread winding along the entire length of the male lead thread; and
rotating the fastener members relative to each other while the at least one male lead thread of the male fastener member passes over and does not thread into the groove in the crest of the at least one female lead thread of the female fastener member.

14. A method for correcting translational misalignment between male and female fastener members to prevent false threading, as claimed in claim 13, wherein the male lead thread is at least a three quarter winding around the shank.

15. A method for correcting translational misalignment between male and female fastener members to prevent false threading, as claimed in claim 13, wherein the male lead thread is at least one-and-one-fifth windings around the shank.

16. A method for correcting translational misalignment between male and female fastener members to prevent false threading, as claimed in claim 13, wherein the male thread profiles at each cross-section between the ends of the male lead thread are defined by arcs having approximately the same radius.

17. A method for correcting translational misalignment between male and female fastener members to prevent false threading, as claimed in claim 13, wherein at least one male lead thread is shortest at a beginning end of the male lead thread winding and tallest at the other end of the male lead thread winding, wherein the male lead thread comprises a crest that has a height that changes at a substantially constant rate between the ends of the male lead thread winding.

18. A method for correcting translational misalignment between male and female fastener members to prevent false threading, as claimed in claim 13, wherein the male lead thread comprises a male lead thread flank that is anchored to the root of an adjacent thread winding along the entire length of the male lead thread.

19. A method for correcting translational misalignment between male and female fastener members to prevent false threading, as claimed in claim 13, wherein the male lead thread comprises a profile that has a height and shape adapted to resist false threading into a groove in the crest of a female lead thread in the interior of a female fastener member.

20. A method for correcting translational misalignment between male and female fastener members to prevent false threading, as claimed in claim 13, wherein a continuous thread helix comprises the at least one male lead thread and the at least one male fastening thread.

21. A method for correcting translational misalignment between male and female fastener members to prevent false threading, as claimed in claim 13, further comprising at least one male anti-cross thread that cams over the female fastening threads of the female fastener member as the male and female fastener members are rotated relative to each other, whereby a longitudinal axis of the shank and a longitudinal axis of the female fastener member become substantially collinearly aligned.

22. A method for correcting translational misalignment between male and female fastener members to prevent false threading, as claimed in claim 13, further comprising at least one male anti-cross thread that has an outside diameter smaller than the major diameter of the at least one male fastening thread, and wherein the at least one male anti-cross thread comprises an exterior surface that is a curved shape approximated by a plurality of flat and curved surfaces and has a profile that fits within a profile of at least one male fastening thread.

23. A method for correcting translational misalignment between male and female fastener members to prevent false threading, as claimed in claim 13, further comprising at least one male anti-cross thread that aligns a longitudinal axis of the shank and a longitudinal axis of the female fastener member, wherein a continuous thread helix comprises the at least one male lead thread, the at least one male anti-cross thread, and the at least one male fastening thread.

24. A method for correcting translational misalignment between male and female fastener members to prevent false threading, as claimed in claim 13, further comprising a lead-in point formed at the lead end of the shank.

25. A method for correcting translational misalignment between male and female fastener members to prevent false threading, the method comprising:
   inserting a lead end of a male fastener member into a female fastener member, wherein the female fastener member comprises:
   at least one female fastening thread formed in an interior of the female fastener member,
   at least one female lead thread formed in the interior of the female fastener member, the at least one female lead thread having a groove in the crest, and
   wherein the male fastener member comprises:
   a shank that has a lead end for insertion into the interior of the female fastener member;
   at least one male fastening thread formed on the exterior of the shank as a plurality of thread windings adapted to mate with the at least one female fastening thread;
   at least one male lead thread formed on the exterior of the shank at the lead end that is at least a half winding around the shank, wherein the at least one male lead thread is shortest at a beginning end of the male lead thread winding and tallest at the other end of the male lead thread winding, wherein the male lead thread comprises a profile that has a height and shape adapted to resist false threading into a groove at the crest of a female lead thread in the interior of a female fastener member; and
   rotating the fastener members relative to each other while the at least one male lead thread of the male fastener member passes over and does not thread into the groove in the crest of the at least one female lead thread of the female fastener member.

26. A method for correcting translational misalignment between male and female fastener members to prevent false threading, as claimed in claim 25, wherein the male lead thread is at least a three quarter winding around the shank.

27. A method for correcting translational misalignment between male and female fastener members to prevent false threading, as claimed in claim 25, wherein the male lead thread is at least one-and-one-fifth windings around the shank.

28. A method for correcting translational misalignment between male and female fastener members to prevent false threading, as claimed in claim 25, wherein the male thread profiles at each cross-section between the ends of the male lead thread are defined by arcs having approximately the same radius.

29. A method for correcting translational misalignment between male and female fastener members to prevent false threading, as claimed in claim 25, wherein at least one male lead thread is shortest at a beginning end of the male lead thread winding and tallest at the other end of the male lead thread winding, wherein the male lead thread comprises a crest that has a height that changes at a substantially constant rate between the ends of the male lead thread winding.

30. A method for correcting translational misalignment between male and female fastener members to prevent false threading, as claimed in claim 25, wherein the male lead thread comprises a male lead thread flank that is anchored to the root of an adjacent thread winding along the entire length of the male lead thread.

31. A method for correcting translational misalignment between male and female fastener members to prevent false threading, as claimed in claim 25, wherein the male lead thread comprises a profile that has a height and shape adapted to resist false threading into a groove in the crest of a female lead thread in the interior of a female fastener member.

32. A method for correcting translational misalignment between male and female fastener members to prevent false threading, as claimed in claim 25, wherein a continuous thread helix comprises the at least one male lead thread and the at least one male fastening thread.

33. A method for correcting translational misalignment between male and female fastener members to prevent false threading, as claimed in claim 25, further comprising at least one male anti-cross thread that cams over the female fastening threads of the female fastener member as the male and female fastener members are rotated relative to each other, whereby a longitudinal axis of the shank and a longitudinal axis of the female fastener member become substantially collinearly aligned.

34. A method for correcting translational misalignment between male and female fastener members to prevent false threading, as claimed in claim 25, further comprising at least one male anti-cross thread that has an outside diameter smaller than the major diameter of the at least one male fastening thread, and wherein the at least one male anti-cross thread comprises an exterior surface that is a curved shape approximated by a plurality of flat and curved surfaces and has a profile that fits within a profile of at least one male fastening thread.

35. A method for correcting translational misalignment between male and female fastener members to prevent false threading, as claimed in claim 25, further comprising at least one male anti-cross thread that aligns a longitudinal axis of the shank and a longitudinal axis of the female fastener member, wherein a continuous thread helix comprises the at least one male lead thread, the at least one male anti-cross thread, and the at least one male fastening thread.

36. A method for correcting translational misalignment between male and female fastener members to prevent false threading, as claimed in claim 25, further comprising a lead-in point formed at the lead end of the shank.

\* \* \* \* \*